United States Patent [19]
Kuhn et al.
[11] 3,711,650
[45] Jan. 16, 1973

[54] ADAPTIVE PULSE CODE MODULATION SYSTEM

[75] Inventors: Thomas G. Kuhn; Neil B. Seitz, both of San Diego, Calif.
[73] Assignee: Logicon, Inc., San Pedro, Calif.

[22] Filed: Oct. 26, 1970
[21] Appl. No.: 83,692

[52] U.S. Cl. ....179/15 BW
[51] Int. Cl. ....H04j 3/00
[58] Field of Search ......179/15 BY, 15 BW, 15 BA, 15.55 R; 178/50, 53 R; 325/39

[56] References Cited

UNITED STATES PATENTS

| | | | |
|---|---|---|---|
| 3,569,631 | 3/1971 | Johannes | 179/15 BY |
| 3,424,869 | 1/1969 | Anderson | 179/15.55 R |
| 3,564,144 | 2/1971 | Diggelmann | 179/15 BY |
| 3,185,823 | 5/1965 | Ellerbick | 179/15.55 R |
| 3,588,364 | 6/1971 | Wallingford | 179/15 BW |

*Primary Examiner*—Kathleen H. Claffy
*Assistant Examiner*—Jon Bradford Leaheey
*Attorney*—Lindenberg, Freilich & Wasserman

[57] ABSTRACT

An adaptive pulse code modulation system useful for increasing the channel capacity of a fixed bandwidth communication link. Channel capacity is increased by reducing the redundancy normally characteristic of known non-adaptive pulse code modulation systems. In the subject adaptive system, the space in a fixed bit length frame is variable allocated to multiple channels on a frame-by-frame basis. That is, each channel is assigned only the number of frame bits actually required to transmit a representation of that channel's digital sample during a particular frame interval. The frame bit space is primarily allocated between a fixed bit length format field and a fixed bit length sample field. The format field is comprised of as may format numbers as there are channels. Each format number is of fixed bit length and expresses the bit position of the most significant "1" in the digital sample of a particular channel. Thus, for example, if 256 different analog levels are to be quantized for each channel, an 8-bit digital sample would be available from each channel. In this case, three bit format numbers are used so that a format number can identify any bit position within the 8-bit digital sample. The aforementioned sample field is comprised of a plurality of variable bit length sample numbers, each associated with a different channel. The sample numbers are comprised of bits which substantially match the bits less significant than the most significant "1" in the corresponding digital sample.

16 Claims, 19 Drawing Figures

INVENTORS
THOMAS G. KUHN
NEIL B. SEITZ
BY Lindenberg, Freilich & Wasserman
ATTORNEYS INVENTORS
THOMAS G. KUHN
NEIL B. SEITZ
BY Lindenberg, Freilich & Wasserman
ATTORNEYS INVENTORS
THOMAS G. KUHN
NEIL B. SEITZ
BY Lindenberg, Freilich & Wasserman
ATTORNEYS INVENTORS
THOMAS G. KUHN
NEIL B. SEITZ
BY
Lindenberg, Freilich & Wasserman
ATTORNEYS INVENTORS
THOMAS G. KUHN
NEIL B. SEITZ
BY
Lindenberg, Freilich & Wasserman
ATTORNEYS INVENTORS
THOMAS G. KUHN
NEIL B. SEITZ
BY
Lindenberg, Freilich & Wasserman
ATTORNEYS INVENTORS
THOMAS G. KUHN
NEIL B. SEITZ
BY Lindenberg, Freilich & Wasserman
ATTORNEYS INVENTORS
THOMAS G. KUHN
NEIL B. SEITZ
BY Lindenberg, Freilich & Wasserman
ATTORNEYS INVENTORS
THOMAS G. KUHN
NEIL B. SEITZ
BY Lindenberg, Freilich & Wasserman
ATTORNEYS INVENTORS
THOMAS G. KUHN
NEIL B. SEITZ
BY Lindenberg, Freilich & Wasserman
ATTORNEYS

FORMAT COUNT MODE TIMING

SAMPLE COUNT MODE TIMING

INVENTORS
THOMAS G. KUHN
NEIL B. SEITZ
BY
Lindenberg, Freilich & Wasserman
ATTORNEYS INVENTORS
THOMAS G. KUHN
NEIL B. SEITZ
BY
Lindenberg, Freilich & Wasserman
ATTORNEYS

ADAPTIVE PULSE CODE MODULATION SYSTEM

BACKGROUND OF THE INVENTION

1. Field of the Invention

This invention relates to an adaptive pulse code modulation system particularly useful in applications involving the transmission of a number of multiplexed voice channels.

2. Description of the Prior Art

The Bell T1 Carrier System is typical of state of the art pulse code modulation (PCM) systems for use in the transmission of a plurality of multiplexed voice channels. The T1 carrier frame format is comprised of 193 bits including a single sync bit and 24 groups of 8 bits, each 8-bit group being dedicated to a different one of 24 channels. Within each 8-bit group, one bit carries supervisory and signalling information and the other seven bits contain a quantized sample of the voice signal voltage. The seven bits, of course, are able to define 128 (±64) different levels.

SUMMARY OF THE INVENTION

It is an object of the present invention to provide an improved PCM system which yields a greater channel capacity than existing systems (e.g., 36 channels utilizing the 193 bit frame) or alternatively which provides better quality transmission for the same channel capacity.

The adaptive PCM system in accordance with the invention differs fundamentally from existing PCM systems in the manner in which multiple (n) channel signals are assigned to the transmission medium. In conventional PCM, equal frame space is allocated in the medium to each of *n* channels, regardless of the actual signal occupancy of the channels or of the statistics of the signals when they are present. As a result, average efficiency is low because of the capability afforded to send maximum value signals on every channel simultaneously and continuously. Nevertheless, the important advantage gained is that performance is guaranteed even under worst-channel loading conditions.

In accordance with the present invention, frame space is allocated to each of the *n* channels on an adaptive, as needed, basis. That is, signals not actually present at the sampling instant are assigned only the minimum number of bits to express this fact while signals, when present, are sent with only the number of bits required to preserve the sampled value at the desired system precision. The bits thus saved through the use of the adaptive process can be used to transmit the samples from additional channels. This increases channel capacity without loss of communications quality.

The primary statistical bases for the adaptive PCM system are the pauses and silent periods which occur naturally in speech communications and the predominance of lower amplitude levels (hence bit saving conditions) which also exist in the normal amplitude distribution of speech. Because these characteristics are always present with speech, are uncorrelated between channels, and are dealt with automatically as they occur, an adaptive system is inherently more efficient than conventional PCM. In addition, however, the adaptive system in accordance with the invention can guarantee a prescribed level of performance with equal confidence to normal PCM under worst channel usage conditions. When channel loading is less than maximum, the adaptive system derives an added measure of benefit.

In order to most clearly describe a preferred embodiment of the present invention, a frame bit length of 193 bits, characteristic of a typical prior art system will be assumed. In accordance with the preferred embodiment of the invention, the 193 bit frame format consists of a sync bit, a mode bit which identifies whether the frame contains differential or absolute samples, a format field comprised of 108 bits, and a sample field comprised of 83 bits.

The format field consists of 36 3-bit numbers, each number being associated with a different one of 36 channels. The value of each format number specifies the position of the most significant "1" in the digital sample derived from the associated channel. For example, the format number for an 8-bit digital sample (00010101) would be 5. When a channel is idle, its format number is 0.

The 83 bit sample field is used to contain the bits from the 36 digital samples less significant than the most significant "1's". At the transmitter or encoder end of the communication link, the digital samples are compressed as follows so as to enable them all to fit within the 83 bits of the sample field:

1. All zero samples (idle channels) are eliminated from the sample field. Idle channels are identified by zero format numbers.
2. The most significant "1" and all the zeros "above" it are removed from each non-zero sample.
3. If there are still too many bits (i.e., greater than 83) to fit in the sample field, the samples are compressed, by removal of least significant bits, until a fit is attained. The resulting error is minimized by means of a round-off procedure performed at the receiver.

It is pointed out that the 193 bit frame format assumed herein does not include bit space for the communication of signalling information. This assumption is valid where, for example, in band signalling is employed in which signalling is accomplished by audio tones transmitted in the channels. Such a technique is used in prior art PCM systems such as Army TD352. If digital signalling is to be employed, it is advantageous to use a multiplexing signalling technique as is used in the prior art PCM system Army TD–968. This multiplexed system is based on the recognition of the enormous waste of channel capacity where one bit per channel per frame is dedicated to signalling information which changes at a relatively slow rate. It has been determined in any event that such a multiplexed system would require no more than 1/6 bit per channel per frame so that, if used in accordance with the invention, would reduce the assumed sample field length to 77 bits (i.e., $83 - (1/6 \cdot 36)$).

The novel features of the invention are set forth with particularity in the appended claims. The invention will be best understood from the following description when read in conjunction with the accompanying drawings.

DESCRIPTION OF THE PREFERRED EMBODIMENTS

Figure 1:
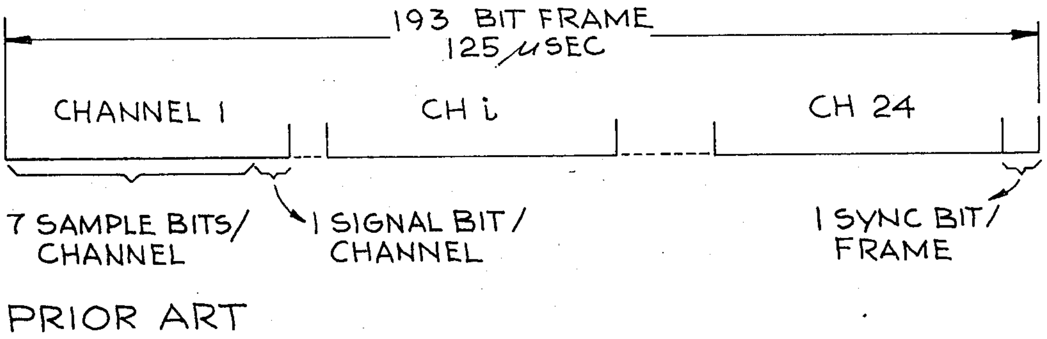
FIG. 1 illustrates the frame format of a typical prior art pulse code modulation system.

Attention is now called to FIG. 1 which illustrates the format of a typical prior art pulse code modulation system frame. Although the frame format illustrated in FIG. 1 is that employed in the aforementioned Bell T1 system, it is exemplary of other state of the art pulse code modulation systems.

As illustrated in FIG. 1, the duration of a frame interval is 125 microseconds and during that interval 193 bits are transmitted over a communication link. Bit 193 in each frame constitutes a sync bit and alternates between the 1 and 0 state in successive frames. The other 192 bits in each frame are allocated proportionately to each of 24 separate channels. Thus, a distinct group of 8 frame bits is dedicated to each of the 24 channels. Bit 8 in each 8-bit group is employed to carry supervisory and signalling information. Bits 1–7 in each 8-bit group are used to represent a quantized sample level of an analog signal appearing on a particular one of the 24 channels. More particularly, in the more usual applications of the prior art system of FIG. 1, voice information in analog form occurs on each of 24 input channels. The analog signal on each channel is periodically sampled at the frame rate (i.e., once every 125 microseconds) and the level thereof is converted to a 7-bit digital word. The 7 bits are capable of defining 128 different levels (±64).

It will be noted from FIG. 1 that a fixed number of bits is dedicated to each channel regardless of the analog level presented on the channel. As will be seen more clearly hereinafter, in accordance with the present invention, a variable number of bits is allocated to each of the channels, depending upon the analog level to be represented. That is, the system in accordance with the present invention adapts the frame format, on a frame-by-frame basis, to the needs of the channels as defined by the levels to be represented. In this manner, a considerably better utilization is made of the frame space thus enabling the channel capacity of a fixed bandwidth system to be increased with equivalent or better quality. Alternatively, of course, channel capacity could be maintained equivalent to the prior art but considerably better quality transmission could be achieved.

In order to facilitate a clear explanation of the present invention, the same fixed bandwidth exemplary of the prior art system of FIG. 1 will be assumed in connection with the description of the preferred embodiment of the present invention. It should, of course, be understood however that the teachings of the invention are equally applicable to communication systems of different bandwidths and different frame lengths.

A better utilization of the 193 bit frame space is achieved in accordance with the present invention by taking advantage of the redundancy present in state of the art systems as exemplified by the system frame format shown in FIG. 1. The prior art frame format of FIG. 1 is redundant in two major aspects. FIRST, it provides frame space (or bandwidth) for simultaneous transmission of voice signals on all 24 channels. However, it is apparent that on the average, only half the channels will have active talkers because one party normally listens while the other party talks. This results in an average "idle channel" redundancy per frame of 96 bits (192/2). The redundancy is even greater during periods when all channels are not active.

Second, the prior art system of FIG. 1 dedicates 7 sample bits to each channel and thus provides space in each frame for the transmission of maximum level speech signals in each channel regardless of the level of the signals actually present. Since the amplitude probability density function of continuous speech is log-uniform (1. P.T. Brady: "A Statistical Basis For Objective Measurement of Speech Levels", Bell Systems Technical Journal, September 1965), the number of bits actually required to transmit 7 bit speech samples is a uniform discrete random variable ranging between 1 and 7; and the average number of bits required is about 5.

It is well known in the prior art (2. R. A MacDonald: "Signal-To-Noise and Idle Channel Performance of Differential Pulse Code Modulation Systems", Bell Systems Technical Journal, Sept. 1966) that the use of differential pulse code modulation can reduce this average number by about 1 bit; i.e., to 4 bits. This results from the high correlation between successive samples taken at the 125 microsecond sampling or frame rate. Since voice signals are relatively slowly varying, the difference between successive samples tends to be small and the small differential samples can be transmitted with fewer bits than absolute samples.

Assuming that an average of 4 bits must actually be transmitted to represent a 7-bit sample, the average "-sample size" redundancy in the prior art frame of FIG. 1 is 72 bits (3×24). The total average redundancy per frame is the sum of the "idle channel" and "sample size" redundancy which is equal to 168 bits (96+72). Thus, the state of the art Bell T1 PCM system illustrated in FIG. 1 has an efficiency of (193−168)/193 or approximately 13 percent.

Although particular mention has been made of the Bell T1 PCM system, it is pointed out that a similar degree of redundancy is present in other existing commercial and military PCM systems. As will be seen hereinafter, an adaptive PCM system in accordance with the present invention better utilizes the bandwidth or frame bit space to increase channel capacity or improve quality or achieve a balance between these two objectives.

Figure 2:
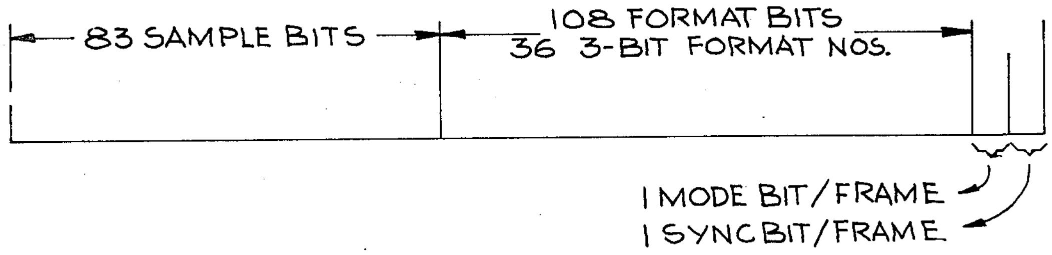
FIG. 2 illustrates the frame format of a pulse code modulation system in accordance with the present invention.

Attention is now called to FIG. 2 which illustrates a typical frame format of an adaptive PCM system in accordance with the present invention. As previously pointed out, instead of dedicating a fixed number of frame bits to each channel, a variable number of bits is allocated dependent upon the value of the particular sample and the number of bits required to represent it. The 193 bit frame illustrated in FIG. 2 includes a sync bit (bit 193) and a mode bit (bit 192) which indicates whether the frame contains differential or absolute samples. The remaining 191 bit positions are used to contain a sample field and a format field. The format field is comprised of as many multi-bit format numbers as there are channels to be handled by the system. That is, the format field will be comprised of $n$ $i$-bit format numbers where $n$ represents the number of channels to be handled. In the exemplary embodiment of the system to be discussed in detail herein, $n$ will be assumed to be 36. Thus, the format field will be comprised of 36 $i$-bit format numbers where each format number is of fixed bit length and has a value identifying a particular characteristic of the digital sample derived from the corresponding channel. More particularly, in accordance with the preferred embodiment of the invention, the value of a format number represents the bit position of the most significant "1" in a digital sample. On the assumption that each digital sample contains $p$ bits $2^i$ must be equal to or greater than $p$. Thus, for example, if it is desired to quantize 128 different levels of an analog signal appearing on a channel, then the digital sample derived therefrom will be comprised of 7 bits (i.e., $p$=7). Each format number then must contain three bits (i.e., $i$=3, $2^3$=8) so that the value of a format number can identify any one of the 7 bit positions in a digital sample and a sample value of zero.

An alternative encoding scheme could be used to enable specification of the position of the most significant "1" in 8 or 9-bit sample magnitudes with 3-bit format numbers. To represent 8-bit sample magnitudes using this scheme the encoder would add 1 to each non-zero sample, and the maximum incoming sample level would be 510 or $(111111110)_2$. This would eliminate the possibility of the most significant "1" occurring in position 1; and the eight 3-bit format numbers could be used to identify positions 2 through 8 of the 8-bit sample magnitude (with the number 0 reserved for the zero or idle state). The same technique could be used to extend the "range" of the 3-bit format numbers to identify the most significant "1" in 9-bit sample magnitudes by adding 3 to each non-zero sample and establishing the maximum incoming sample level at 1020 or $(1111111100)_2$. The most significant 1 would then never occur in bit positions 1 or 2; and the eight format numbers would be used to identify positions 3 through 9 of the 9-bit sample. The alternative encoding scheme is not incorporated in the exemplary embodiment described herein, but is mentioned to demonstrate the ability of the invention to accommodate samples greater than eight bits in length.

It should now be clear that the format field, in accordance with the present invention, comprises $n$ groups of fixed bit length wherein each group is uniquely dedicated to a different channel. In the exemplary embodiment of the invention where $n$=36 and $i$=3, the format field will be 108 bits in length leaving 83 bits in the sample field. In accordance with the present invention, the bits of the sample field are variably allocated on a frame-by-frame basis to each of the channels to contain the bits in the digital sample less significant than the most significant "1". Accordingly, bits of the sample field are assigned to channels only as actually required to transmit the sample during a particular frame interval. It is as a consequence of the bit space saved through the use of this adaptive frame format that a greater number of channels can be represented within the 193 bits.

As noted, the 83 bit sample field is used to contain the bits from the 36 channels less significant than the most significant "1" in each of the digital samples. In many instances, as for example when many channels are idle, the 83 bit sample field may be of sufficient length to fully contain these less significant digital sample bits. However, in some cases there may be more of these less significant digital sample bits than can be accommodated within the 83 bit sample field. In this event, it is necessary to compress these less significant bits in a manner which will enable them to be accurately reproduced at the decoder or receiver end of the communication link. In accordance with the preferred embodiment of the invention, the digital samples are compressed at the encoder or transmitter end of the communication link in the following manner to enable them to fit within the 83 bit sample field:

1. All zero samples (idle channels) are eliminated from the sample field. Idle channels are identified by zero format numbers.

2. The most significant "1" and all the zeros "above" it are removed from each non-zero sample.

3. If there are still too many bits (i.e., greater than 83) to fit in the sample field, the samples are compressed by removal of the least significant bits until the fit is attained. The resulting error is minimized by means of a round off procedure performed at the decoder end of the communication link.

Attention is now called to the following Table I which depicts the processing of seven different original digital samples (a–g). Considering exemplary original sample (a), note that the most significant "1" is in bit position 4 of the original sample. Thus, the value of the 3-bit format number is equal to decimal for, i.e., $(100)_2$. The corresponding minimized sample constitutes the bits in the original sample following the most significant "1" and thus the minimized sample is 010,1 where the 1 to the right of the comma represents the sign (i.e., ±). If there is sufficient room in the sample field, the format number and the minimized sample as illustrated in line (a) of Table I will both be transmitted, as is, within the format and sample fields respectively of a frame. However, on the assumption that the minimized sample shown in line (a) of Table I does not fit within the 83 bit sample field because of the length of the other 35 minimized samples within a particular frame interval, then it is necessary to compress the bit length of the minimized sample. This is accomplished by dropping the least significant bit of the minimized sample to therefore develop the compressed sample 01,1 as shown in line (a) of Table I, where the 1 to the right of the comma again represents the sign. As will be seen hereinafter, the decoder at the receiving end of the communication link regenerates a sample close to the original sample based on the receipt of the format number and the compressed sample. Receipt of the format number of course enables the decoder to properly regenerate the most significant "1" and all the zero bits above it. Receipt of the compressed sample enables the decoder to replace with complete accuracy some of the bits below the most significant "1" but, of course, there is no way for the decoder to know the state of the bits dropped during compression at the encoder end of the communication link. Accordingly, as will be seen hereinafter, the decoder employs a round off procedure to replace the dropped bits. Briefly, the round off procedure consists of replacing the dropped bits with bits defining the midpoint of the range definable by the dropped bits. That is, if one bit is dropped in forming the compressed sample from the minimized sample as represented in line (a) of Table I, this means that the range was somewhere between decimal 0 and 1 and thus the midpoint is equal to one-half which is represented by one bit to the right of the decimal point, in the least significant bit position of the regenerated sample as shown in line (a) of Table I. On the other hand, if two bits are dropped in forming the compressed sample from a minimized sample as shown in line (g) of Table I, this means that the value of the dropped bits lies somewhere within the range from decimal 0 to 3. Thus, these two bits are replaced with the value decimal 1½ or 01.1 in the bit positions 321 respectively of the regenerated sample. It is pointed out that in forming the compressed sample from a minimized sample, no bits are dropped from samples having only two bits or less following the most significant "1", i.e., samples having format numbers equal to or less than 2.

Figure 3:
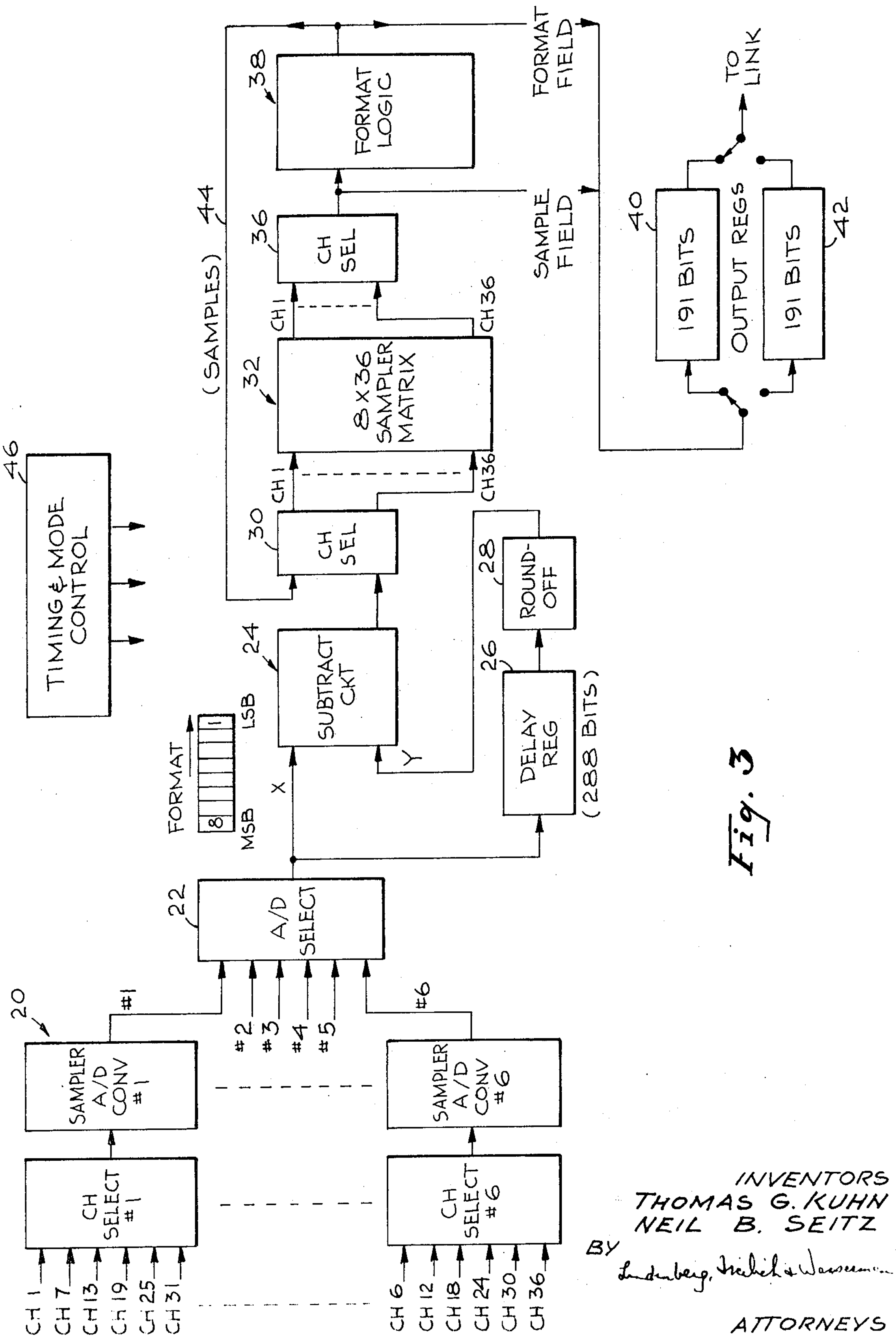
FIG. 3 is a block diagram of the encoder or transmitter end of a system in accordance with the present invention.

Attention is now called to FIG. 3 which illustrates a block diagram of the encoder or transmitter end of a communication link employing the adaptive pulse code modulation in accordance with the present invention. Briefly, the encoder of FIG. 3 samples 36 incoming voice channels, converts the amplitude samples into PCM form, computes the difference between the present sample and the previous sample from the same channel (in the differential mode) and then packs the samples into the 193 bit adaptive frame format shown in FIG. 2.

More particularly, the incoming speech signals are preferably pre-processed so that they range between specific analog levels, e.g., 0 and 10 volts, with the "0" level (no signal) at 5 volts. The 36 signals are sequentially applied, in numerical order, to the six sample and A/D converter circuits 20. The six converter circuits 20 operate on a round robin basis; converter 1 first outputs a sample from channel 1, then converter 2 outputs a sample from channel 2, and so on up to channel 6 after which converter 1 outputs the signal from channel 7, converter 2 from channel 8 and so on until all 36 channels have been sampled. Operating the six converters in this manner minimizes the delay resulting from the relatively slow process of A/D conversion. The converters encode each analog sample into a positive eight bit binary number which is gated through a selection network 22 to a subtraction circuit 24. The subtraction circuit 24, when operating in the differential mode, differences the sample applied thereto with the previous digital sample from the same channel, retrieved from a delay register 26 to form the "original sample" referred

TABLE I

| | Sample MSB → LSB (7 6 5 4 3 2 1) | Sign | Number | Sample* | Compressed sample (Sample**) | Round-off*** Regenerated sample after round-off MSB → LSB (8 7 6 5 4 3 2 . 1) | Sign |
|---|---|---|---|---|---|---|---|
| (a) | 0 0 0 1 0 1 0 , | 1 | $(100)_2$ | 0 1 0 , 1 | 0 1 , 1 | 0 0 0 1 0 1 0 . 1 , | 1 |
| (b) | 0 0 0 0 1 1 1 , | 0 | $(011)_2$ | 1 1 , 0 | 1 , 0 | 0 0 0 0 1 1 0 . 1 , | 0 |
| (c) | 0 1 0 1 0 0 0 , | 0 | $(110)_2$ | 0 1 0 0 0 , 0 | 0 1 0 0 , 0 | 0 1 0 1 0 0 0 . 1 , | 0 |
| (d) | 1 0 0 0 0 0 0 , | 1 | $(111)_2$ | 0 0 0 0 0 0 , 1 | 0 0 0 0 0 , 1 | 1 0 0 0 0 0 0 . 1 , | 1 |
| (e) | 0 0 0 0 0 0 1 , | 0 | $(001)_2$ | – , 0 | – , 0 | 0 0 0 0 0 0 1 . 0 , | 0 |
| (f) | 0 0 0 0 0 0 0 , | 1 | $(000)_2$ | | | | |
| (g) | 1 1 1 1 1 1 1 , | 0 | $(111)_2$ | 1 1 1 1 1 1 , 0 | 1 1 1 1 , 0 | 1 1 1 1 1 0 1 . 1 , | 0 |

*The minimized sample consists of the sample bits "below" the most significant "1", before compression.

**The compressed sample is the portion of the minimized sample that remains after least significant bits have removed as required to make the samples fit in the sample field. In the example, it is assumed that one bit is removed from each of the upper four samples, two bits from the bottom one.

***Note that the regenerated sample is 8 bits, with LSB right of decimal point. When no bits are removed from a sample during compression the LSB is zero.

to in Table I. The output of the delay register 26 is passed through a round off logic means 28 prior to being applied to the subtract circuit 24. As will be seen hereinafter, the round off circuit 28 effectively performs the same procedure on the previous digital sample as is performed on that sample at the decoder or receiver end of the communication link. Thus, the differential sample which is actually transmitted from the encoder represents the difference between the new sample and the rounded off sample seen during the prior frame interval by the decoder at the communication system receiver end.

The differential digital samples yielded by the subtraction network 24 are directed by channel select network 30 to the appropriate one of 36 sample registers contained within a sample matrix 32.

After all 36 digital samples have been stored within the sample matrix 32, they are sequentially applied through a channel select network 36 to a format logic means 38. The format logic means 38 generates 36 format numbers which are provided to one of two output registers 40 and 42 to form the previously mentioned format field. Two output registers 40 and 42 are provided so that during any format interval, one of the output registers is outputting data to the communication link while the other output register is being loaded with the format and sample fields.

As the format logic means 38 develops the format numbers it recirculates the samples via line 44 to the sample matrix 32. It then may or may not be necessary to form the compressed samples from the minimized samples, as shown in Table I, depending upon the particular format numbers generated. In any event, the bits to constitute the sample field are thereafter read out of the sample matrix 32.

Figure 4:
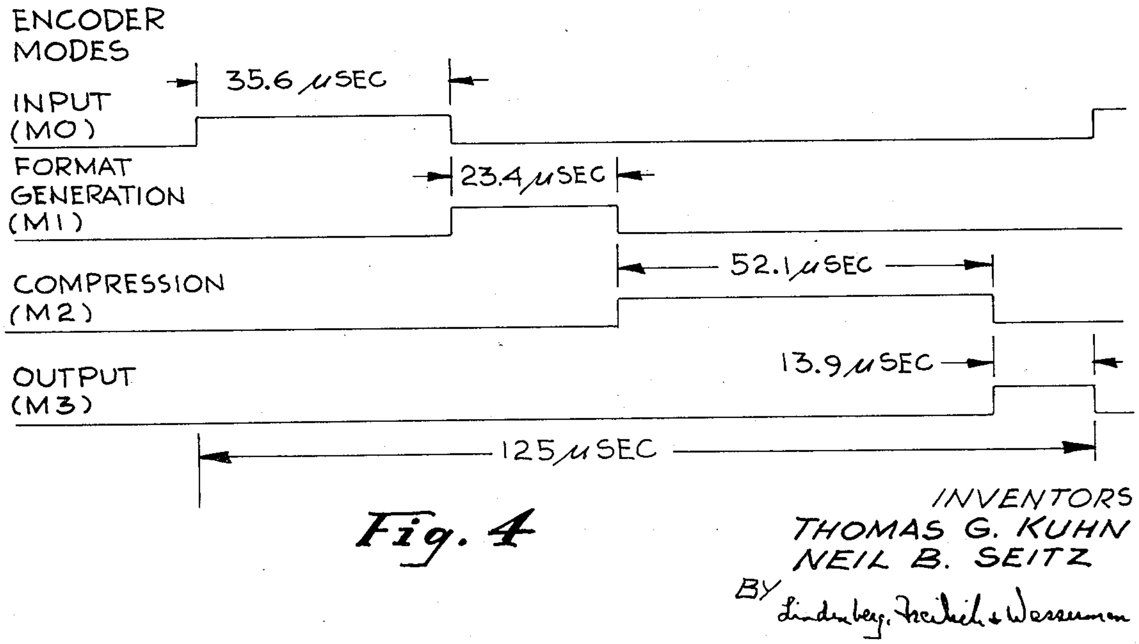
FIG. 4 is a timing diagram illustrating the major timing modes defined in the operation of the equipment illustrated in FIG. 3.

All of the modules illustrated in the encoder block diagram of FIG. 3 operate in response to timing and mode control signals provided by logic means 46. The logic means 46 provides mode control signals which define the four major encoder processing modes; namely, the input mode, the format generation mode, the compression mode, and the output mode. FIG. 4 illustrates the approximate duration of each of these modes.

The input mode which will be referred to as mode MO, occupies approximately 35.6 microseconds of the 125 microsecond frame interval. During the input mode, digital samples of each of the 36 voice signals are developed and loaded into the sample matrix 32.

The format generation mode, referred to hereinafter as mode M1, occupies approximately 23.4 microseconds of the 125 microsecond frame interval. During the format generation mode, each sample is circulated through the format logic 38 and returned to the sample matrix 32. During this mode, the format logic 38 generates the format numbers and supplies them to the inactive output register 40, 42.

The compression mode, referred to hereinafter as mode M2, occupies up to approximately 52.1 microseconds, depending upon the amount of compression required, during each 125 microsecond frame interval. During the compression mode, bits are removed from the samples stored in the sample matrix 32, as required, to reduce the total number of bits to be transmitted to 83. The duration of the compression mode of course depends upon the number of bits to be removed.

The output mode, referred to hereinafter as mode M3, occupies approximately 13.9 microseconds of the frame interval. During the output mode, the 83 sample bits are clocked out of the sample matrix to the inactive output register 40, 42 to form the sample field.

As previously noted, during each 125 microsecond frame interval while a given frame is being developed in the inactive one of the output registers, the previously developed frame contained within the active output register is being outputted to the communication link. The two output registers 40 and 42 change functions each frame.

Attention is now called to FIG. *5a* which illustrates one of the 36 registers contained within the sample matrix 32 of FIG. 3. The sample register contains eight flip-flops FF1–FF8, to hold the sample or differential magnitude. Note well that eight flip-flops are required to store the differential magnitude because the original digital sample, as shown in Table I, is comprised of seven bits plus a sign bit and at the extreme, the difference between successive digital samples available at the output of the subtract circuit 24 could have a magnitude requiring eight bits; i.e., the difference could exceed decimal 127. In a preferred embodiment of the invention disclosed herein, it is assumed that the subtract circuit 24 provides eight magnitude bits and a sign bit and that negative numbers are expressed in 2's complement form. It will further be assumed that the subtract circuit 24 outputs the magnitude and sign bits serially as represented in FIG. *5b*. FIG. *5b* depicts the successive occurrence of 12 basic timing pulses T1–T12. The eight magnitude bits available from the subtract circuit 24 are entered into flip-flops FF1–FF8 during timing pulses T4–T11. The sign bit provided by the subtract circuit is entered into sign flip-flop FF9 during timing pulse T12.

In addition to the flip-flops FF1–FF9 each sample register includes a flip-flop FF10 which, as will be discussed hereinafter, is provided to detect the occurrence of a "problem" count, $(10000000)_2$. This count is decoded separately to ensure a correct differential approximation in the unlikely event of the differential exceeding the capacity of of the bottom seven bits of the sample register.

More particularly, initially consider the output (X−Y) of the subtract circuit when, for example, the binary equivalent of X=+120 and Y=−10 are applied thereto. In this case, the output of the subtract circuit will be decimal +130, thus requiring eight bits to represent the magnitude and one bit for the sign; i.e., 10000010 and a sign bit 0. If X=−120 and Y=+10, then the subtract circuit output will be decimal −130 which would be provided in 2's complement form; i.e., 01111110 and a sign bit 1. As will be seen hereinafter, in the unlikely event that the differential sample has a magnitude in excess of decimal 127, either plus or minus, then that sample is subsequently replaced by the seven bit equivalent of decimal 127. This replacement is performed in response to a "CIRCULATE 1's" control signal which is generated when the sample sign bit is plus (i.e., "0") and sample bit 9 (in flip-flop FF8) is "1" or when the sign is minus (i.e., "1") and sample bit 8 (flip-flop FF8) is "0". Recognition of these two logical conditions does not encompass the situation of a differential sample exactly equal to decimal −128 which in 2's complement form is 10000000 with a sign bit equal to "1". Thus, the differential sample 10000000, previously referred to as the "problem" count, must be decoded separately to cause the generation of CIRCULATE 1's control signal.

Flip-flops FF1–FF7 are connected as a conventional shift register with the output of flip-flop FF7 being coupled to the input of flip-flop FF6, the output of flip-flop FF6 being coupled to the input of flip-flop FF5, etc. Inputs to the flip-flop FF7 are derived through a pair of OR gates 50 and 52 respectively connected to the set and complement input terminals of flip-flop FF7. The OR gates 50 and 52 selectively receive information from the flip-flop FF8 during the input mode MO or from the format logic means 38 during the format generation mode M1. More particularly, during the input mode MO, AND gates 54 and 56 provide input information to the flip-flop FF7 via the OR gates 50, 52. On the other hand, during the format generation mode M1, AND gates 58, 60 respectively provide information through the OR gates 50, 52 to the flip-flop FF7.

The differential magnitude information (X–Y) from the output of the subtract circuit 24 is coupled directly to the set input terminal of flip-flop FF8, and through an inverter 66 to the complement input terminal of flip-flop FF8. The IN SHIFT pulses produced during timing pulses T4–T11 are applied to the clock terminal of flip-flop FF8. The IN SHIFT pulses are also coupled through OR gate 70 to the clock input terminals of flip-flops FF1–FF7. As a consequence, the eight differential magnitude bits provided at the output of the subtract circuit 24 are loaded into the flip-flops FF1–FF8, least significant bit first, during the input mode M0. The sign bit produced by the subtract circuit during pulse T12 is entered into flip-flop FF9.

As previously pointed out, in the event a differential sample exceeds decimal 127, the sample is subsequently replaced by the seven bit equivalent of decimal 127 (i.e., 1111111). This replacement is executed by the apparatus of FIG. *6a* in response to the generation of the control signal CIRCULATE 1's and will be discussed hereinafter. FIG. *5a* illustrates the gating for determining when the signal CIRCULATE 1's should be generated.

It will be recalled that replacement of the sample by a sample equal to decimal 127 is performed when bit 8 of the sample is "1" and the sign is + (i.e., "0") or when bit 8 of the sample is "0" and the sign is — (i.e., "1"). These two logical conditions are recognized by an exlusive OR gate 72. One input to the exclusive OR gate 72 is derived from the "1" output of the sign flip-flop FF9. The second input to the exclusive OR gate 72 is derived from the "1" output of flip-flop FF8. It will also be recalled that in addition to these two logical conditions, it is also necessary to replace the input differential sample with the decimal value 127 in the event of a "problem" count (i.e., 1000000). This count is recognized by the flip-flop FF10. More particularly, the flip-flop FF10 is preset by the PRESET pulse, during timing pulse T1, depicted in FIG. *5b*. Thereafter, the flip-flop FF10 during each of timing pulses T4–T10 monitors the subtract circuit output (i.e., X–Y). If the first seven bits of the differential sample are all zero, then the flip-flop FF10 will remain in a zero state thus providing a true signal level on its "0" output terminal connected to the input of AND gate 76. The second input to AND gate 76 is derived from the "1" output of flip-flop FF8 which represents the state of bit 8. Thus, AND gate 76 will provide a true output signal upon recognition of the "probelm" count 10000000. The outputs of gates 72 and 76 are applied to the inputs of OR gate 78 whose output constitutes the previously referred to signal CIRCULATE 1's.

Prior to terminating the discussion of FIG. *5a*, it is pointed out that only one of the inputs to the OR gate 70 has thus far been specifically discussed. That is, FIG. *5a* has been considered primarily with reference to the input mode M0 during which the IN SHIFT pulses of FIG. *5b* are generated and applied to the OR gate 70 for shifting bits through the flip-flops FF7–FF1. During subsequent modes (i.e., format generation mode M1, compression mode M2, and output mode M3) enabling signals, to be discussed hereinafter, are applied to the input of OR gate 70 to shift the contents of flip-flops FF7–FF1 to the right.

Attention is now called to FIG. *6a* which illustrates the details of the format logic means 38 of FIG. 3. The format logic means controls operation of the encoder during the format generation, compression, and output modes, and controls sample round off, i.e., operation of the round off means 28 of FIG. 3, during the input mode.

Prior to considering the format logic means of FIG. *6a* in detail, the operation of the format logic means during each of the format generation, compression, and output modes will be briefly summarized.

The format generation mode M1 consists of 36 identical cycles, i.e., one cycle for each channel. During each cycle, the lower seven bits of one of the sample registers (as shown in FIG. *5a*) is shifted through the format logic means of FIG. *6a* and then returned back to the same sample register. Within the format logic means of FIG. *6a* the sample is serially 2's complemented if it is a negative number or replaced with all 1's if its value exceeded decimal 127 as hereinbefore described. More particularly, it will be recalled that the output of gate 78 of each of the sample registers will be true at the end of the input mode if the magnitude of the sample stored therein exceeds decimal 127. The resulting sample bits, modified as necessary, are used to control the operation of a three bit decrementing format count register which operates to determine the format number for each sample. The format count register is preset to seven at the beginning of each of the 36 cycles. Each time a "0" is encountered in the sample output, the format count register is decremented by one and each time a "1" occurs, the register is reset to seven. After all seven sample bits have been clocked through the format logic, the format count register will contain the position of the most significant "1" in the sample. This format count or number is then dumped into the end three stages of a 108 stage F1 register and identifies the number of bits to be transmitted for the corresponding sample. Thus, in addition to being dumped into the F1 register, the format number is directly added to a sum register which is preset to −83

(i.e., the bit capacity of the sample field) at the beginning of the format generation mode. After the format number has been dumped into the F1 register and added to the sum register, the F1 register is shifted right to both shift the format count into the inactive output register and back into the left end of the F1 register.

As each format number (number bits to be transmitted) is added to the sum register, the sum therein is counted up towards zero. If the count in the sum register is still negative after all 36 format numbers have been added to the original count of −83, the samples will fit into the 83 bit sample field and no compression is required. If the count in the sum register is positive however, it specifies the number of bits that must be removed from the samples in order to fit within the sample field. The bit removal is accomplished during the compression mode.

During the compression mode, the three bit format numbers in the F1 register are successively shifted right into the last three stages thereof. In addition, an identical 108 stage F2 register is similarly shifted right. If the format number shifted into the end three stages of the F1 register during a particular compression cycle is greater than two, it is decremented by one and the sample in the corresponding matrix sample register is shifted right one bit to thus drop the least significant bit therefrom. In addition, the sum register is decremented by one and the three bit number in the end three stages of the F2 register is incremented by one. This process continues until the sum register is decremented to zero. The remaining sample bits then fit within the 83 bit sample field and the F1 register contains the number of bits to be transmitted for each sample. The F2 register contains the number of bits removed from each sample.

During the output mode, each F1 format number is again shifted right into the end three stages of the F1 register and output pulses determined by the value of the format number are gated to the corresponding sample register to shift the sign bit and significant sample bits out into the inactive output register. Each time a bit is outputted, the F1 format number is decremented. When the F1 format number reaches zero, all bits for the corresponding sample have been outputted and the contents of the F1 register are then shifted three bits right. This process continues until all significant bits have been outputted from the matrix sample registers to the inactive output register. The F1 register will then contain all zeros, and thus be ready for the succeeding format generation mode.

Figure 5A:
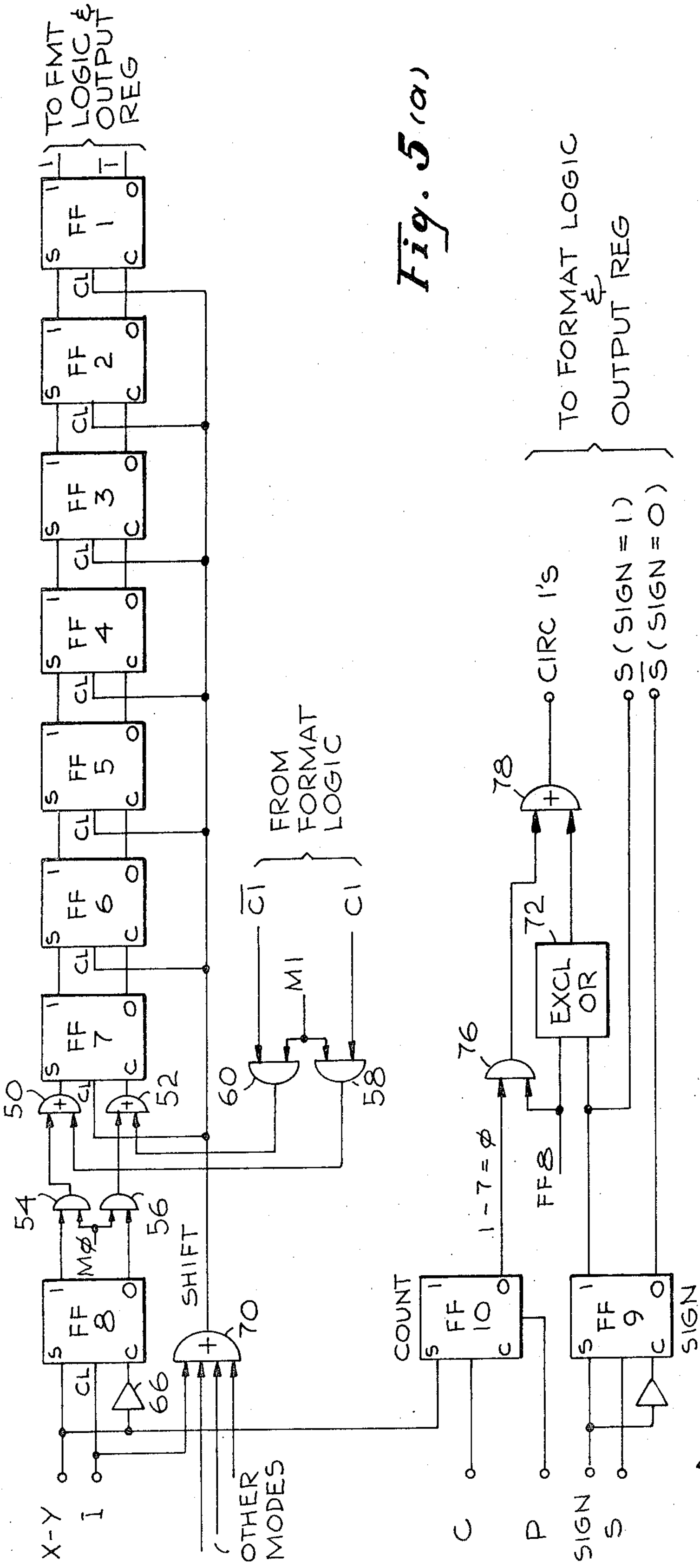
FIG. 5*a* is a block diagram of a typical sample register contained within the sample matrix of FIG. 3.
Figure 5B:
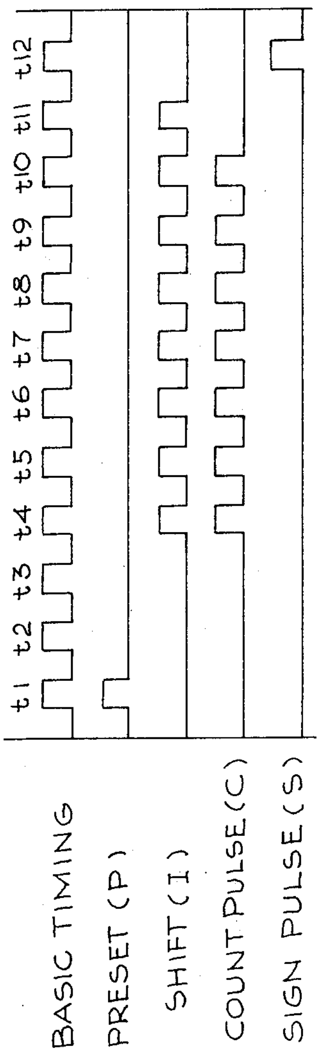
FIG. 5*b* is a timing diagram applicable to the sample register of FIG. 5*a;*

Attention is now again directed to FIG. 6a which illustrates the format logic means apparatus for executing the aforedescribed operations. It has been pointed out that the format generation mode consists of 36 cycles, each cycle corresponding to a different one of the 36 channels. The channel select means 36 shown in FIG. 3 which couples the appropriate matrix sample register to the format logic means during each of the 36 cycles, constitutes a conventional gating network and accordingly has not been illustrated in detail. Since the 36 cycles of the format generation mode are identical, only one cycle will be discussed in detail. Thus, during each format generation mode cycle, the output of the sample register flip-flop FF1 will be coupled to the data input terminal 100 of a 2's complement converter circuit 102. SAMPLE SHIFT timing pulses, provided during the format generation mode as shown in FIG. *6b*, are applied to the converter timing input terminal 103. More particularly, note that during the format generation mode M1, nine timing pulses $(T1)_1$–$(T9)_1$ are generated during each cycle. SAMPLE SHIFT pulses are generated during timing pulses $(T2)_1$–$(T8)_1$ for gating the seven bits from flip-flops FF1-FF7 of the sample register. If the sample gated out of the sample register is negative, then it is presented in 2's complement form and the converter 102 will convert it to sign/magnitude form. On the other hand, if the sample gated out of the sample register is positive, it already is in sign/magnitude form and will merely be passed by the converter 102 to the output terminal 104 for application to the OR gate 106. The output of OR gate 78 of the sample register is also coupled to the OR gate 106. It will be recalled that the output of the sample register OR gate 78 will be true at the termination of the input mode if the sample stored in the sample register exceeds decimal 127. Thus, the output of OR gate 106 will comprise a series of seven bits which will be all ones if a decimal value of 127 or greater is presented. The output of OR gate 106 is connected directly to a terminal identified as C1 and through an inverter 108 to a terminal identified as $\overline{C1}$. These terminals are respectively connected to the AND gates 56 and 60 of FIG. 5*a* for returning the sample, modified as necessary, to the sample register from which it was drawn.

The output of the OR gate 106 is initially connected to an AND gate 110. The output of the inverter 108 is connected to the input of AND gate 112. The AND gates 110 and 112 are enabled by the previously mentioned SAMPLE SHIFT pulses. The output of AND gate 110 is connected to the input of OR gate 114 which, when enabled, resets a three stage decrementing format count register 116, to a count of seven. OR gate 114 is also responsive to a PRESET timing pulse (FIG. *6b*) occurring coincident with timing pulses $(T1)_1$. The output AND gate 112 is connected to the decrementing input terminal of register 116.

From what has been said thus far with respect to FIG. *6a*, it should be recognized that during each of the 36 identical cycles of the format generation mode, a sample is read in from one of the 36 matrix sample registers and modified, as required, by the converter 102 or CIRCULATE 1's line coupled to OR gate 106. During each cycle the decrementing format count register 116 is preset to a count of seven.

As each "1" bit emerges from the OR gate 106, the format count register 116 is reset to seven and as each "0" bit emerges the register 116 is decremented. Thus, at the end of timing pulse $(T8)_1$, the format count in the register 116 will define the position of the most significant "1" in the sample. As shown in FIG. *6b* during the final timing pulse $(T9)_1$ of each cycle, a DUMP pulse is generated to enable gates 118 and transfer the 3-bit format count out of the register 116.

The format count is transferred through the gates 118 to the end three stages of a 108 stage F1 register. The F1 register is a shift register and the output from the last three stages is connected to the data input terminal 120 of the left most stage. AND gate 122 couples the output of the 105th stage to the input of the last three stages.

In addition to the format count being transferred from the register 116 into the last three stages of the F1 register, it is additionally applied to an adder 124. The adder 124 is an eight stage parallel adder and receives inputs from the output of a sum register 126 and the gates 118. The output of the adder 124 is coupled to the input of the register 126. As previously pointed out, at the beginning of the format generation mode, the sum register 126 is set to a count of −83, i.e., the bit capacity of the sample field (see FIG. 2). As each new format number is developed, during the 36 format generation mode cycles, and added to the count in the sum register, the sum register count will approach zero and may exceed zero on the positive side. If it does not exceed zero at the end of the 36 cycles, then the sample bits will fit in the sample field without compression. If, after the completion of the 36 format generation mode cycles, the sum register is positive, then it must be reduced to zero during the compression mode. Decoder 128 is coupled to the output of the sum register 126 to determine whether the sum exceeds zero or is equal to or less than zero.

After each format count is developed by the register 116 and dumped into the last three stages of the F1 register, the contents of the F1 register are shifted right by FORMAT SHIFT pulses applied to the F1 register timing input terminal 121 and transfer gate 122 by the format shift gate 130. The gate 130 is enabled during the format generation mode M1 by the output of OR gate 132. Note from FIG. 6*b* that FORMAT SHIFT pulses are generated during each cycle during timing pulses $(T2)_1$–$(T4)_1$. In addition, when the format number is shifted out of the last three stages of the F1 register, it is also shifted into the inactive output register (40 or 42) through gate 134 enabled by the output of gate 136.

Thus, the foregoing procedure continues for 36 cycles of the format generation mode and at the completion thereof, the decoding means 128 indicates whether or not the remaining sample bits will fit within the 83 bit sample field. If the decoding means 128 indicates that the sum in the sum register 126 is greater than zero, then the compression mode is required. The timing for the compression mode is illustrated in FIG. 6*c*.

The compression mode is comprised of a variable number of cycles depending upon the number of sample bits to be deleted to fit within the 83 bit sample. Each cycle however is comprised of four timing pulses $(T1)_2$–$(T4)_2$. During each cycle, a DECREMENT pulse is generated coincident with timing pulse $(T1)_2$ and FORMAT SHIFT pulses are generated coincident with timing pulses $(T2)_2$–$(T4)_2$.

In addition to the F1 register, a 108 stage F2 shift register is also provided. Register F2 can be identical to register F1. During the compression mode, the format numbers stored in the F1 register are decremented as bits are deleted from the samples in order to compress the number of sample bits to achieve a sample field fit. Each time a format number is decremented by one, the corresponding three bits of the F2 register are incremented by one so that at the end of the compression mode, the F2 register will contain 36 three bit numbers each representing the number of bits dropped from a particular sample.

More particularly, it is pointed out that the OR gate 132 is enabled during the compression mode M2, as well as the format generation mode M1, to apply the FORMAT SHIFT pulses to the transfer gates of the register F1. Similarly, OR gate 140 enables the format shift F2 gate 142 to apply format shift pulses to the transfer stages of register F2 during the compression mode. Assume that at the end of a format generation mode, the sum register is positive and a compression mode is therefore required. When the compression mode begins, the format number associated with channel 1 is shifted into the end three stages of the F1 register. If this format number is greater than two, as detected by decoder means 150, then the sample stored in the corresponding sample register is compressed by shifting it right to drop a least significant bit. AND gate 152 is enabled during the compression mode M2 coincident with each decrement pulse (see FIG. 6) if the sum register count is greater than zero and if the format number detected by encoder 150 is greater than two. The output of gate 152 is coupled back to the sample matrix by line 154 and supplied to the input of gate 70 to shift the contents of flip-flops FF1-FF7 one bit to the right. In addition, the output gate 152 decrements, via gate 156, the format number in the last three stages of register F1 and increments the number in the last three stages of register F2. In addition, the output of gate 152 decrements the sum register by 126. This procedure continues until the count in the sum register is reduced to zero. After the count in the sum register is reduced to zero, the compression mode terminates and the output mode M3 is initiated. The timing for the output mode M3 is illustrated in FIG. 6*d*.

During the output mode, as many timing pulses are dedicated to each channel as are required to read out the remaining significant bits from that channel sample register. The exemplary output mode timing illustrated in FIG. 6*d* assumes that a sign bit plus two sample bits are outputted from channel 1, a sign bit plus four sample bits are outputted from channel 2, no bits are outputted from channel 3, and a sign bit plus one sample bit are outputted from channel 4.

During the output mode M3, the contents of the F1 and F2 registers are shifted right by the FORMAT SHIFT pulses provided by gates 130 and 142 respectively. As each new format number comes into the last three stages of the F1 register, it is decoded by the decoder 150. The gate 160 is responsive to the output of the decoder 150. If the format number in the last three stages of the F1 register is greater than zero and if operation is in the output mode, then the OUT SHIFT pulses, generated as shown in FIG. 6*d*, are supplied by the gate 160 via gate 156 to the decrementing input terminal of the F1 register. Additionally, the output of gate 160 is supplied via line 162 back to the input of OR gate 70 of the appropriate sample matrix register. As a consequence, as the format number is decremented towards zero, the bits of the corresponding sample are shifted out from the sample register to the inactive output register (40 or 42). The output mode continues until all of the format numbers in register F1 are reduced to zero at which time all the sample bits will have been shifted into the inactive output register. It is pointed out that the number of timing pulses allocated to each channel during the output mode is determined by the value of the last three bits of the F1 register. Thus, for example, note that in the examples in FIG. 6*d* after three output pulses have been generated in association with channel 1, the format number goes to zero which then allows the channel 2 time to begin. During the output mode M3, the first three basic timing pulses during any channel interval are dedicated to generating three FORMAT SHIFT pulses to shift registers F1 and F2 to the right. After the three shift pulses have been generated, then the output pulses are generated until the format number is decremented to zero.

During the input mode, the F2 register is employed together with the round off means 28 of FIG. 3 to round off the sample output from the delay register 26 so that the subtract circuit sees a value Y corresponding to that regenerated by the decoder means at the receiving end of the communication link.

More particularly, during the input mode M0, the round off process is accomplished as follows for each sample. The three bit number for that sample is shifted into the end three stages of the F2 register. This number specifies the number of bits removed from the sample being outputted from the delay register 26 since it will be recalled that the last three stages of the F2 register were incremented during the compression mode as the last three stages of the F1 register were decremented. The end three stages of the F2 register function as a decrementing counter as well as a shift register during the input mode. The F2 number is decremented in response to pulses provided by gate 168 as each bit is outputted from the delay register.

Figure 7:
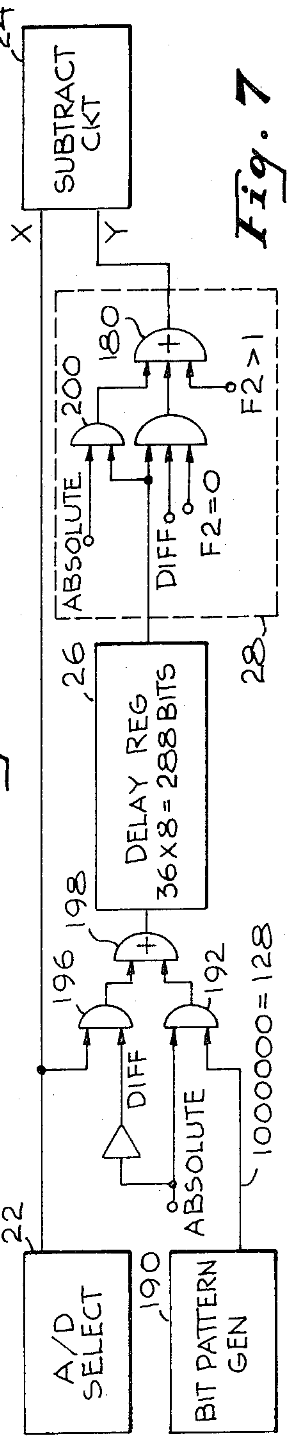
FIG. 7 is a block diagram illustrating in greater detail, the portion of FIG. 3 including the delay register and round-off means.

The value of the F2 format number is used to gate the output of the delay register, as shown in FIG. 7, as the sample is shifted out. As long as F2 is greater than one, a 1 is outputted from OR gate 180 to the Y input of the subtract circuit 24. When F2 equals 1, a zero is presented to subtract circuit since the gate 180 will be disabled. When F2 is equal to zero, the sample bits from the delay register are presented to the subtract circuit without modification. This process approximates the round off procedure previously discussed in which dropped bits are replaced at the system decoder end with bits defining the mid point of the range definable by the dropped bits. That is, if two bits were dropped in forming the compressed sample, the dropped bits are replaced, by the round off means 28 of FIGS. 1 and 7, by 01. As will be seen hereinafter, at the decoder, the dropped bits are replaced by 01.1.

Thus far it has been assumed that the communications system in accordance with the present invention is always operating in a differential mode in which the difference between successive samples derived from a channel is transmitted, rather than the absolute value of a sample. Where bandwidth requirements are tight, use of a differential mode of operation is usually much more satisfactory than an absolute mode. However, in situations where the analog signal may vary at a very great rate, it may be desirable to operate in an absolute mode. In accordance with the present invention, operation in the absolute mode is accomplished by effectively bypassing the differencing operation. This is done by effectively entering a value of decimal 128 into the delay register 26 of FIG. 7 instead of the value of the previous sample. More particularly, as shown in FIGS. 3 and 7, eight bit samples are provided by the select means 22. The eight bits define 256 different levels (± 128), and the decimal number 128 (i.e., 10000000) constitutes the mid point or zero level. Accordingly, when operating in the absolute mode, this bit pattern is provided by a pattern generator 190 as shown in FIG. 7 and coupled through an AND gate 192 enabled by an absolute control signal 194. The absolute control signal disables the gate 196 through which samples are normally stored in the delay register when operating in the differential mode. In the absolute mode, the gate 196 is disabled and the gate 192 enabled to provide the bit pattern equivalent to decimal 128 through OR gate 198 to the delay register. Also, when operating in the absolute mode, no round off is performed but rather the bits from the delay register are coupled directly through AND gate 200 and OR gate 280 to the Y input of the subtract circuit 24.

It should of course be recognized that all of the apparatus thus far described and illustrated in FIGS. 3–7 constitutes part of the encoder or transmitter end of a communication system in accordance with the present invention. Attention will now be directed to FIGS. 8–12 which illustrate a decoder or receiver end of a communication system in accordance with the present invention. The decoder end of the system is intended of course to accept the minimized and/or compressed samples transmitted from the encoder end and in response thereto to regenerate the original samples as closely as possible.

More particularly, the decoder end of the system is intended to perform the following major functions:

a. Synchronize the local decoder frame and bit timing with that generated at the system encoder end.

b. Demodulate the incoming PCM pulses into the binary 1's and 0's corresponding to the frame transmitted by the encoder.

c. Expand the minimized and compressed transmitted samples into nine bit sign magnitude numbers rounded off according to the number of bits removed at the encoder.

d. Add the regenerated samples to previously stored absolute samples if the frame is differential; or replace the stored absolute samples with the regenerated samples if the frame is absolute.

e. Convert the resulting absolute samples back into the 36 analog voice signals by digital to analog (D/A) conversion and low pass filtering.

Figure 8:
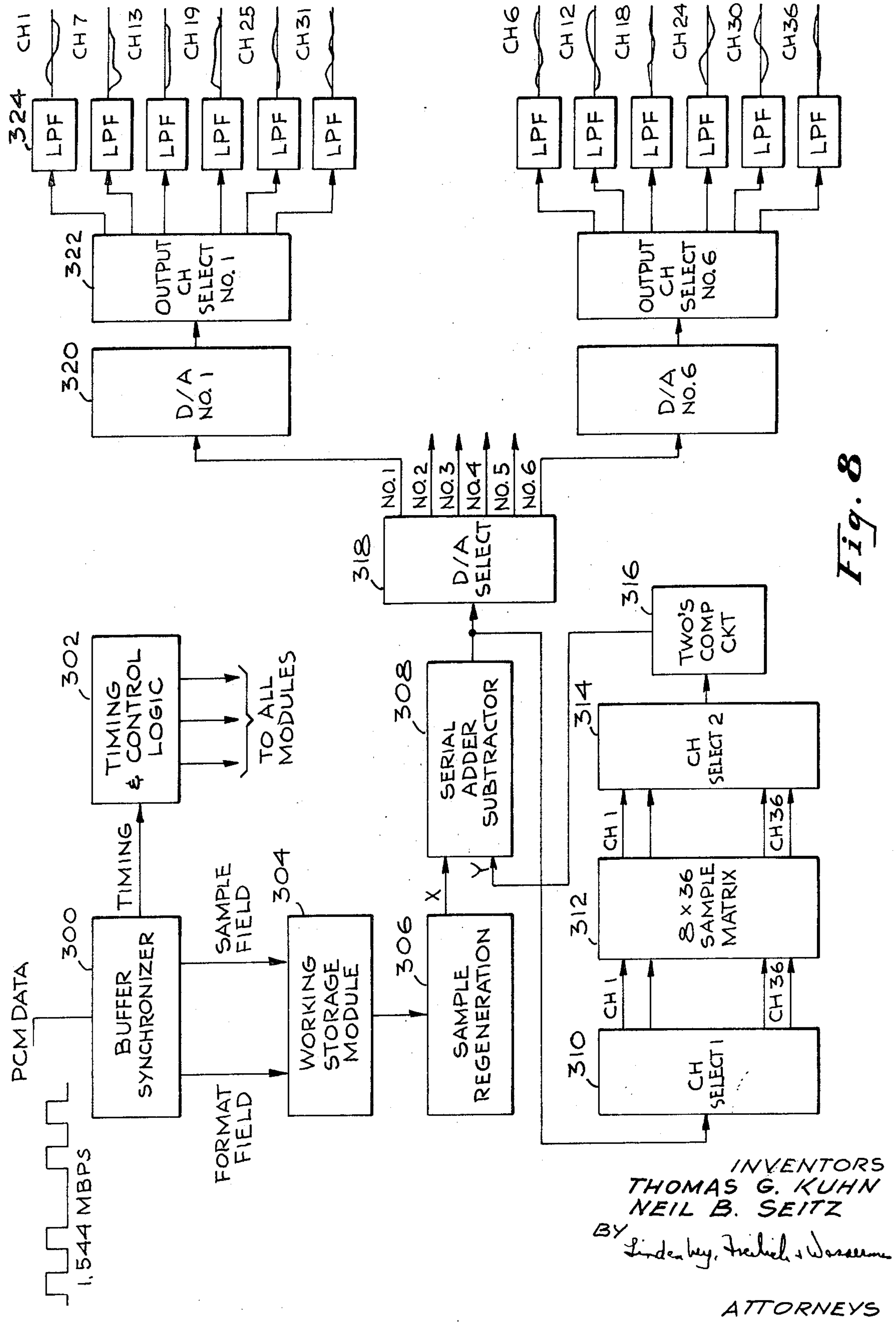
FIG. 8 is a block diagram of the decoder or receiver end of a system in accordance with the present invention.

Attention is now called to FIG. 8 which illustrates a block diagram of the entire decoder end of a communication system in accordance with the invention. The decoder includes a buffer synchronizer 300 which accepts the PCM data received over the communication link. As will be discussed in greater detail hereinafter, the buffer synchronizer provides timing information to a timing and control logic means 302 which generates the appropriate timing for all of the decoder modules. In addition, the buffer synchronizer applies the received format and sample fields to a working storage module 304 which manipulates the received format numbers to determine the number of bits removed from each sample at the system encoder end. The output of the working storage module 304 is applied to a sample regenerator module 306 which regenerates each original sample by replacing the bits dropped at the encoder end and appropriately combining them with the bits of the received minimized or compressed sample. The output of the sample regenerator module 306 is applied as the X input to a serial adder subtractor module 308. If the received frame is identified as being comprised of differential samples, then the module 308 will add each newly regenerated sample to the previous sample from the same channel to form a new absolute sample. The output of the serial adder subtractor module 308 is passed through channel select means 310 to a sample matrix 312. The sample matrix 312 contains 36 9-bit locations with each location being dedicated to storing the absolute sample level for a particular channel. The contents of the sample matrix is in turn outputted through a second channel select network 314 and applied as the Y input to the added subtractor module 308. The 2's complement converter circuit 316 between the channel select network 314 and the module 308 is actuated, as necessary where a subtraction operation is required. If the received frame contains absolute, rather than differential information, then the module 308 does not perform any arithmetic but merely replaces the appropriate absolute value in the sample matrix with the new absolute value.

Regardless of whether the received frame contains absolute or differential information, the module 308 will sequentially provide new absolute samples from each of the 36 channels. The absolute samples outputted by the module 308 are applied through a selection network 318 to six D/A converters 320 which constitute the counterparts of the A/D converters 20 of the system encoder end (FIG. 3). The outputs of the D/A converters are coupled through output selection networks 322 to low pass filters 324 which in turn output analog signals essentially corresponding to the analog signals applied as inputs to the system encoder end.

In the operation of the decoder of FIG. 8, PCM pulses enter the buffer synchronizer 300 from the communication link continuously, at a 1.544 megabit rate. The decoder bit timing is derived from a clock pulse oscillator in the buffer synchronizer which resonates at the expected bit rate. The derived bit timing drives a frame counter which outputs an alternating 1 to 0 pattern in the 193rd bit position of each frame. This locally generated framing signal is compared with successive bits of the incoming frames until synchronization with the received framing signal is attained. The incoming PCM signals are decoded into binary 1's and 0's by sampling in synchronism with the derived bit timing.

As will be seen hereinafter, the buffer synchronizer 300 contains two 192 bit registers which exchange functions each frame, analogous to the exchange of functions between output registers 40 and 42 of FIG. 3. During each frame one input register, the "active" register, is receiving the incoming data from the communication link at 1.544 megabits per second. The other "inactive" register stores the preceding frame prior to its transfer to the decoder working storage module.

Figure 9:
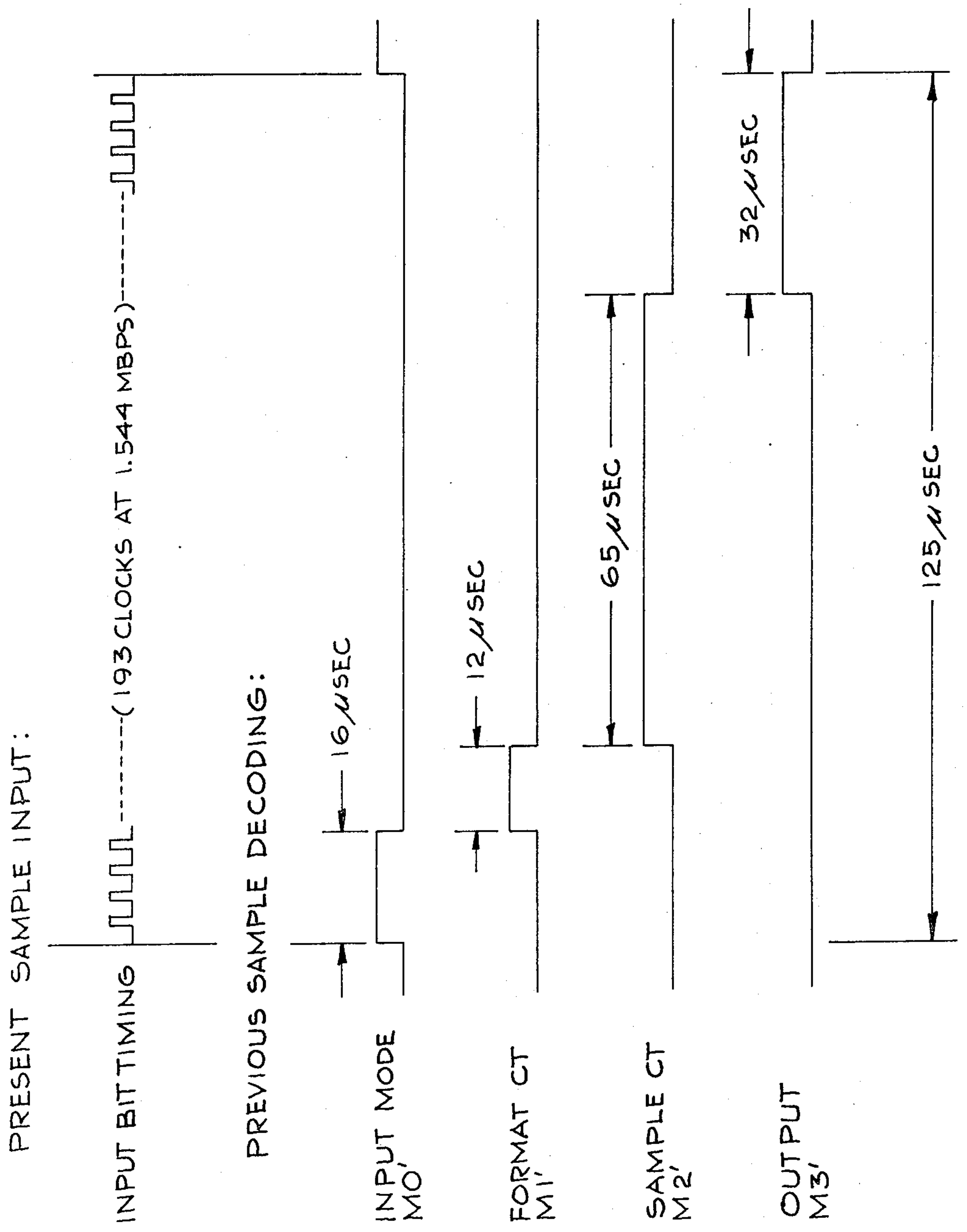
FIG. 9 is a timing diagram illustrating the major timing modes defined in the operation of the equipment illustrated in FIG. 8.

The decoding process is accomplished in four major processing cycles or modes: input mode (M0'), format count mode (M1'), sample count mode (M2'), and output mode (M3'). The approximate duration of each mode is illustrated in FIG. 9.

Briefly, during the input mode M0', 191 bits are transferred from the inactive input register in the buffer synchronizer 300 to the working storage module. During the format count mode M1', a count of the number of significant bits in the 36 original samples is developed in the working storage module by adding the 36 format numbers. During the sample count mode M2', the number of bits removed from each sample during compression at the encoder end is computed and stored in the working storage module. During the output mode M3', each sample is clocked out of the working storage module to the sample regenerator where it is converted from its minimized and compressed form into a 9 bit sign magnitude number, rounded off in accordance with the same criteria previously discussed in connection with the round off means 28 of FIG. 3.

As noted, the decoder will treat the regenerated number either as an absolute (positive or negative) sample or as a differential from the previously stored sample for the corresponding channel, depending on the frame mode bit. If the mode bit is a "1" indicating an absolute frame, the decoder simply replaces the previously stored sample with the new (absolute) sample and outputs the new sample to the appropriate D/A converter. If the mode bit is a "0", indicating a differential frame, the decoder adds the new sample to the previously stored sample for the same channel; the result is stored as the new absolute sample and is outputted to the appropriate D/A converter. An absolute frame is transmitted initially to store the proper "reference levels" at the decoder. Absolute frames are preferably transmitted periodically to recalibrate each signal to an absolute level. This is of value in preventing digital errors causing cumulative shifts in the signal level.

It should be noted that since the sample regenerator outputs 9 bit numbers, the least significant magnitude bit must be given a weight of decimal one-half (i.e., $2^{-1}$) by the D/A converter. The decoder sample matrix, however, stores only the sign and the most significant seven bits of the adder/subtractor output. That is, it does not store the $2^{-1}$ bit. This insures that the encoder and decoder ends of the system always relate differentials to the same reference levels.

The six D/A converters change the digital samples into pulse amplitude modulation (PAM) pulses which are gated to the appropriate channel output. Low pass filtering of the PAM pulses recovers the original audio signal.

Figure 10:
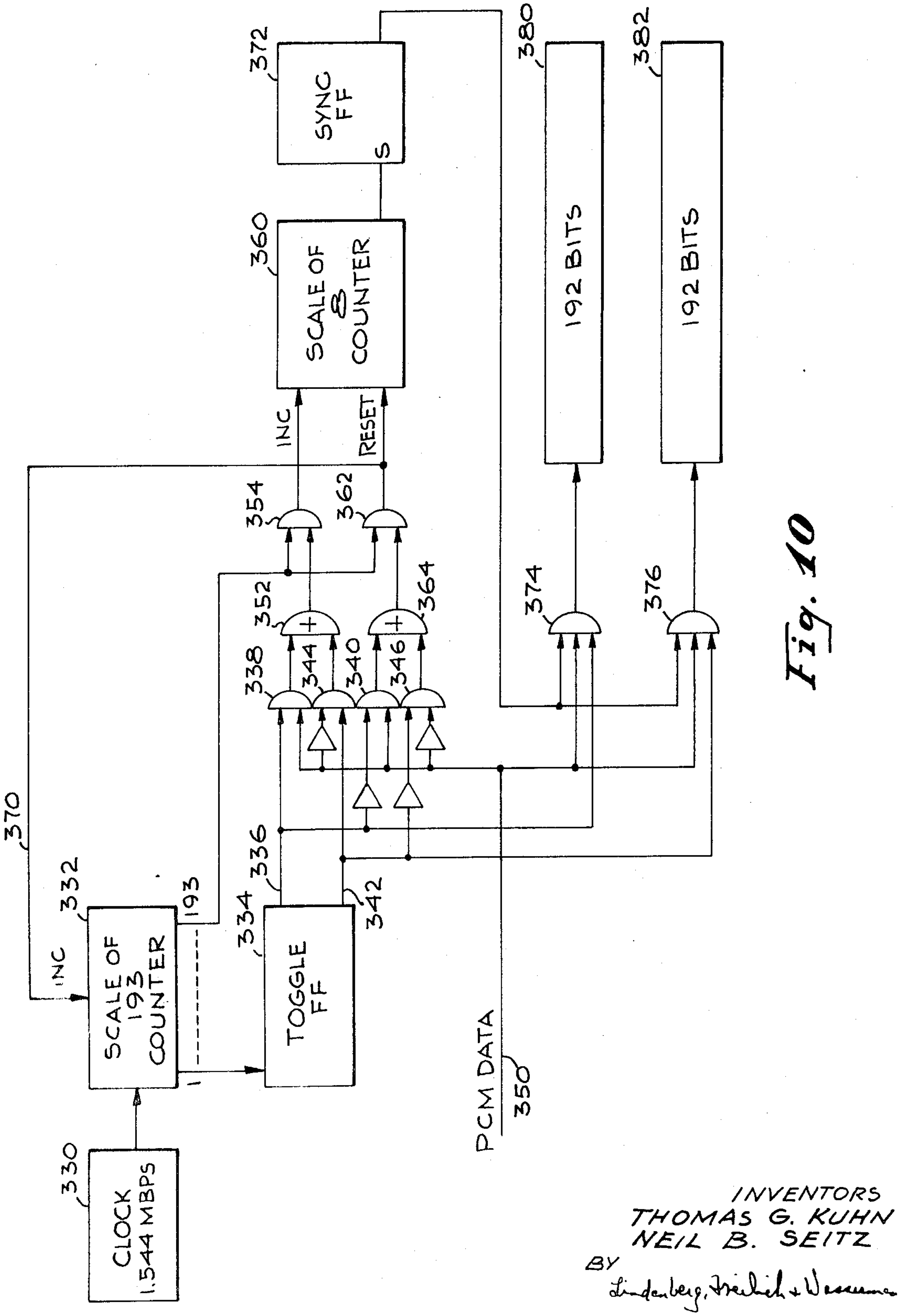
FIG. 10 is a block diagram of the buffer synchronizer of FIG. 8.

Attention is now called to FIG. 10 which illustrates the buffer synchronizer 300 in greater detail. As previously pointed out, the buffer synchronizer includes a clock circuit 330 providing clock pulses at the rate of 1.544 megapulses per second. The output of clock circuit 330 is applied to a scale of 193 counter 332. The count 1 output terminal of the counter 332 is coupled to the input of a toggle flip-flop 334. Thus, every time counter 332 defines a count of 1, the toggle flip-flop 334 changes state to thus successively define odd and even frames. In order to synchronize the decoder timing with the received frame format, 1's and 0's are alternately provided during successive 193 counts defined by counter 332. If the locally generated alternately provided 1's and 0's match the bits concurrently received over the communication link through a sufficient number of successive cycles, then sync is achieved. The relative phase of the counter 332 is continually adjusted until such sync is achieved.

Comparison of the locally generated 1's and 0's during count 193 of counter 332 with the bits received over the communication link can be achieved as shown in FIG. 10. The first output terminal 336 of the toggle flip-flop, which will be assumed to be true during odd frames, is connected directly to the input of AND gate 338 and through an inverter to the input of AND gate 340. The second toggle flip-flop output 342, which will be assumed to be true during even frames, is connected directly to the input of AND gate 344 and through an inverter to the input of AND gate 346. The PCM data line 350 is connected directly to the inputs of AND gates 338 and 340 and through inverters to the inputs of AND gates 344 and 346. During odd frames, output terminal 336 will be true and whenever the PCM data is also true, i.e., "1", gate 338 will be enabled. The output of gate 338 is applied to the input of OR gate 352. During even frames, toggle flip-flop output terminal 342 will be true and whenever the PCM data is false, i.e., "0 "gate 344 will be enabled. The output of gate 344 is also applied to the input of OR gate 352. The output of OR gate 352 is connected to the input of AND gate 354 which is enabled during count 193 of counter 332. Thus, if the PCM data constitutes a "1" during count 193 of an odd frame, AND gate 354 will provide a true output pulse. Similarly, if during count 193 of an even frame, the PCM data constitutes a "0", the gate 354 will provide a true output pulse. The output pulses provided by gate 354 are connected to the incrementing input terminal of a counter 360, illustrated as constituting a scale of 8 counter, since it has been assumed that if the locally generated sync bit matches the received sync bit during eight successive frames, then sync is achieved. The scale of 8 counter 360 is reset by the output of AND gate 362 whenever the sync bit received on the PCM data line does not match the locally generated sync bit. That is, if during a locally assumed odd frame, a "0" appears on the PCM data line, then AND gate 346 will provide a true output signal. Similarly, if a "1" appears on the PCM data line during count 193 of the locally developed even frame, gate 340 will provide a true output signal. The outputs of gates 340 and 346 are connected to the input of OR gate 364 whose output is connected to the input of AND gate 362, coupled to the reset input terminal of counter 360.

Thus, whenever the received sync bit matches the locally generated sync bit, the counter 360 is incremented and whenever the received and locally generated sync bits mismatch, the counter 360 is reset. Moreover, whenever the counter 360 is reset, the phase of the counter 332 is adjusted by incrementing counter 332 via line 370. Only when the locally generated sync bit matches the transmitted sync bit during eight successive frames will the counter 360 reach a count of 8. When this occurs, the sync flip-flop 372 provides a true input signal to gates 374 and 376. The PCM data line is connected to the inputs of both gates 374 and 376. Gate 374 is enabled whenever toggle flip-flop 334 defines an odd frame and gate 376 is enabled whenever toggle flip-flop 334 defines an even frame. Thus, gates 374 and 376 alternately apply the data appearing on the PCM data input line 350 to the previously mentioned 192 bit registers 380 and 382. During each frame, one of the registers will be "active" i.e., receiving PCM data from the line 350. During the immediately succeeding frame, the other register will be active. During each frame, the contents of the inactive register (380 or 382) is transferred to the working storage module shown in FIG. 11A.

Figure 11A:
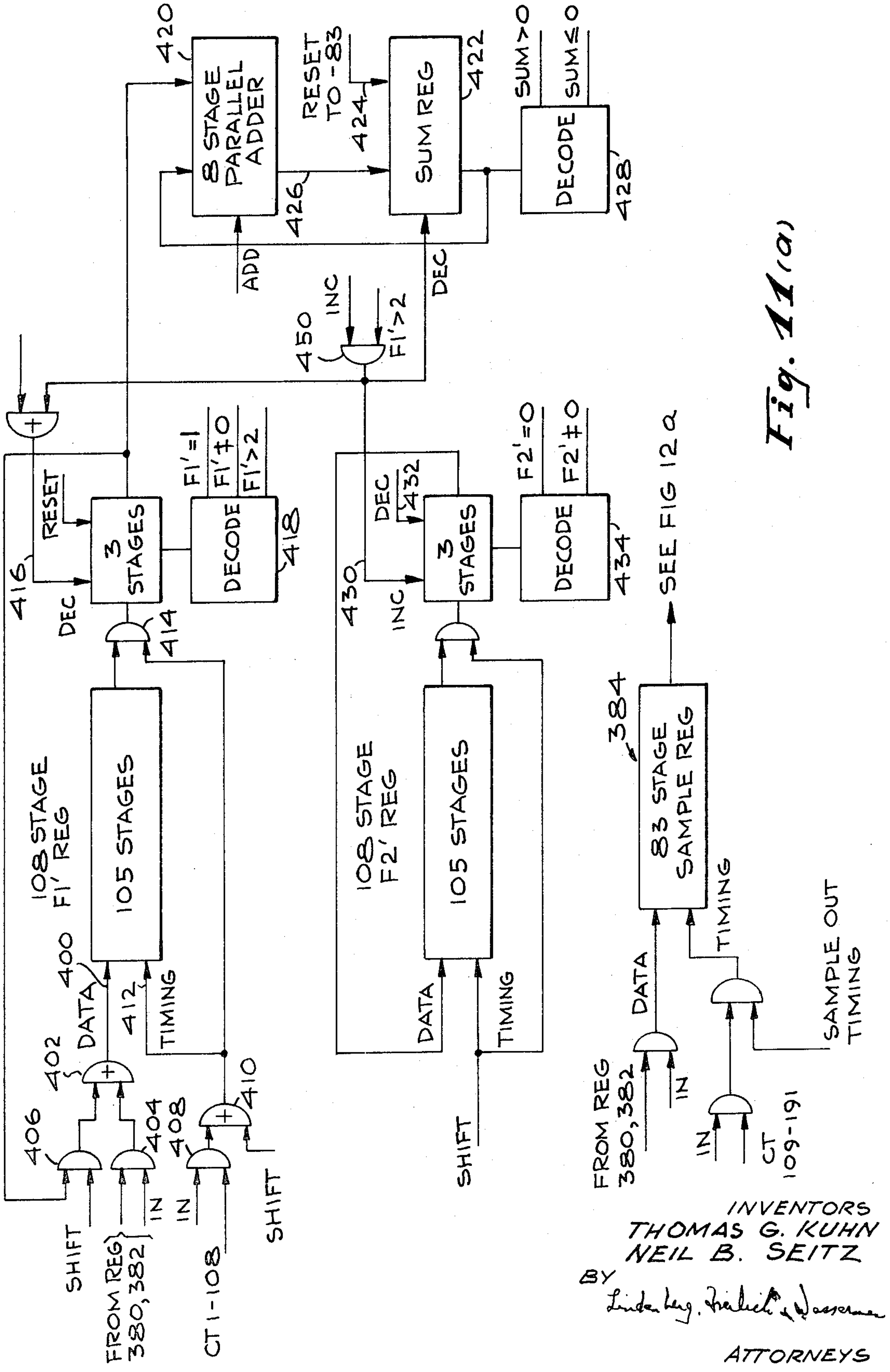
FIG. 11*a* is a block diagram of the working storage module of FIG. 8.
Figure 11:
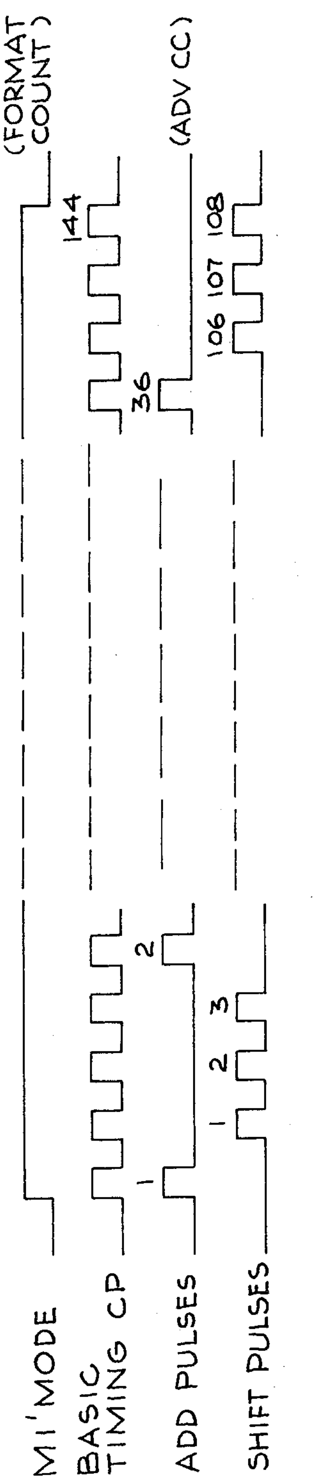
FIG. 11*b* is a timing diagram illustrating the timing signals applicable to the working storage module of FIG. 11*a* during the format count mode.
FIG. 11*c* is a timing diagram illustrating the timing signals applicable to the working storage module of FIG. 11*a* during the sample count mode.
Figure 11:
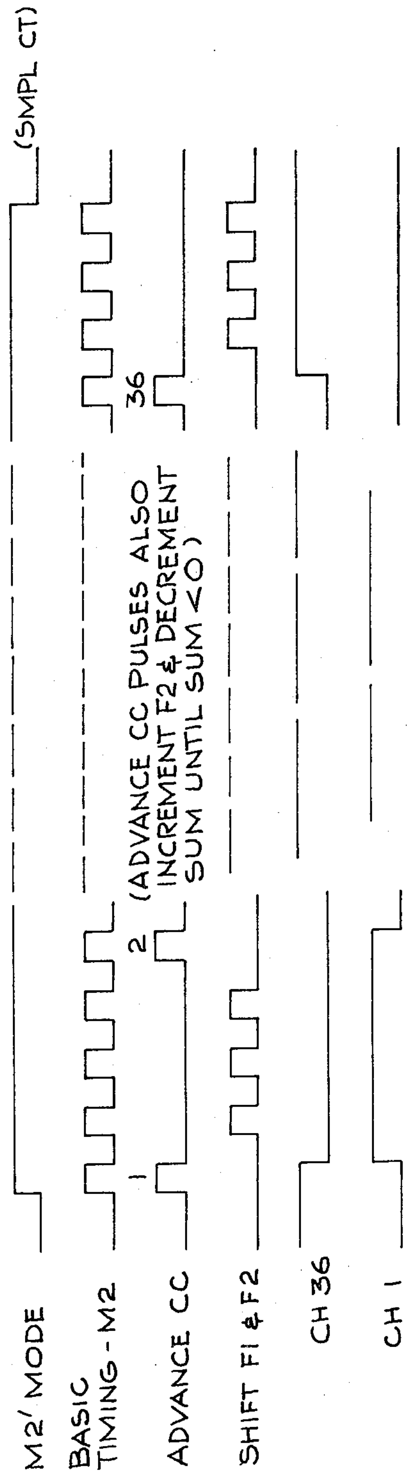

The working storage module of FIG. 11A is primarily comprised of a first 108 stage register F1', a second 108 stage register F2', and an 83 stage sample register 384. As will be seen hereinafter, the registers F1' and F2' of FIG. 11A correspond somewhat in function to the registers F1 and F2 of FIG. 6a. Register F1' is utilized to initially store the received format numbers during the input mode M0'. Based upon the sum of the 36 3-bit format numbers entered into the F1' register, 36 3-bit format numbers are developed in the F2' register which respectively identify the number of bits dropped at the encoder end from each of the samples. Once it is determined how many bits have been dropped from each of the samples, these bits are regenerated by the sample regenerator 306, represented in detail in FIG. 12A, and are outputted together with the associated sample bits from the 83 bit sample register 384.

Figure 6A:
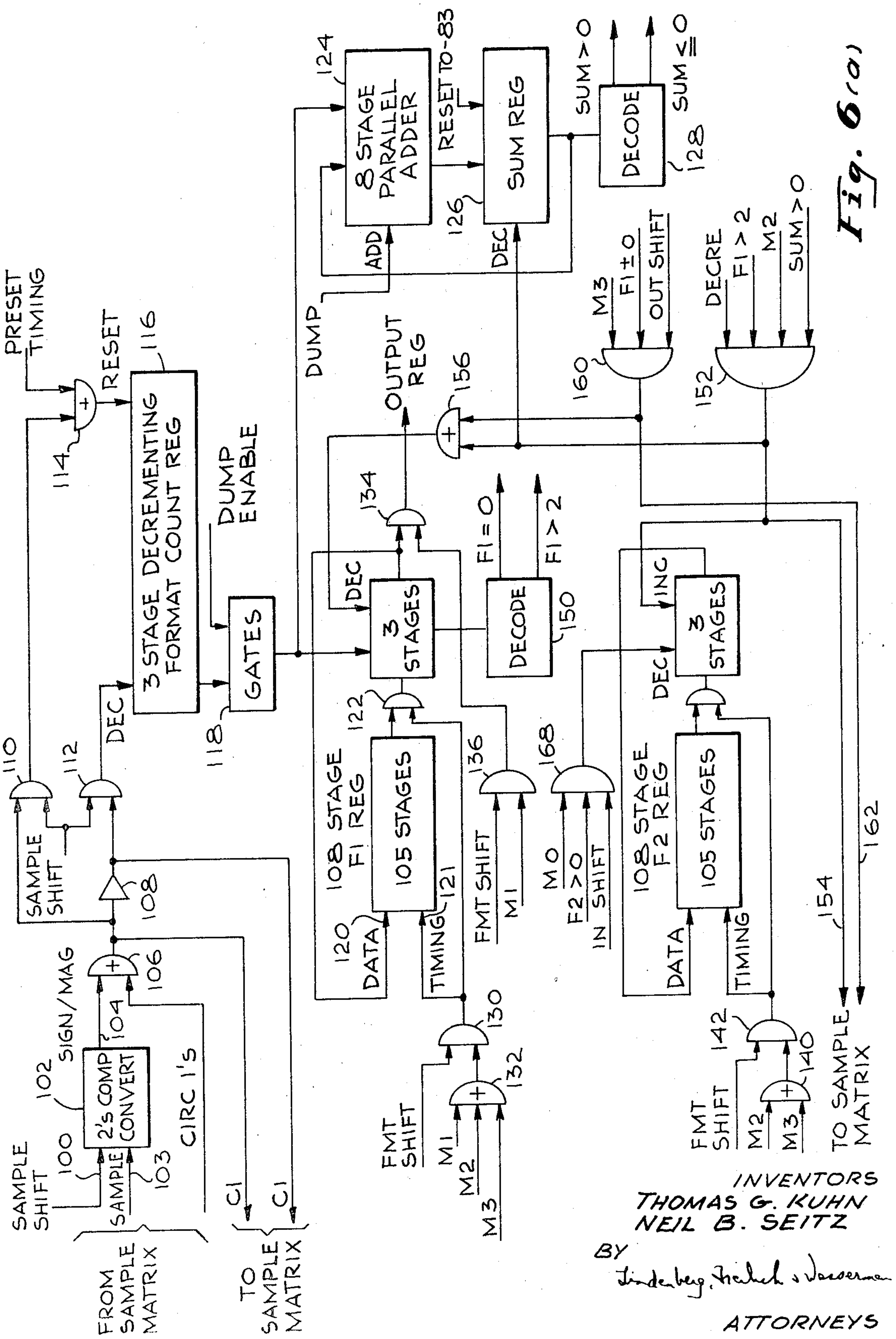
FIG. 6*a* is a block diagram illustrating, in greater detail, the format logic means of FIG. 3.
Figure 6B:
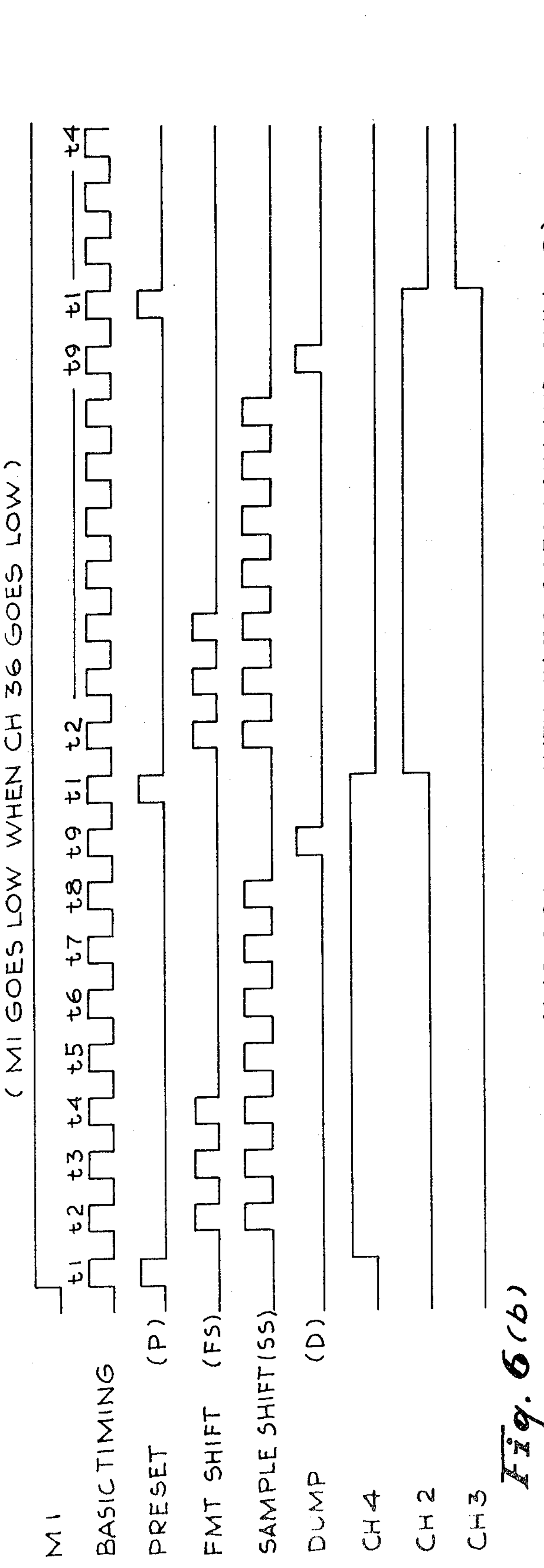
FIG. 6*b* is a timing diagram illustrating the timing signals occurring in the equipment of FIG. 6*a* during the format generation mode.
Figure 6C:
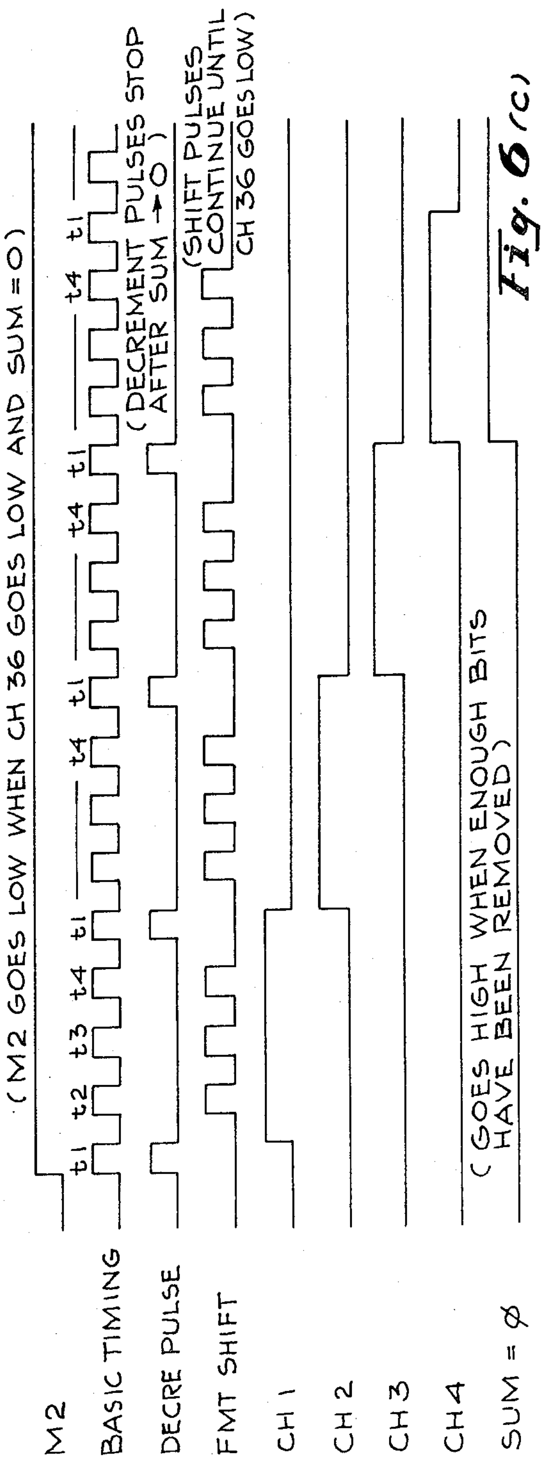
FIG. 6*c* is a timing diagram illustrating the timing signals occurring in the equipment of FIG. 6*a* during the compression mode.
Figure 6D:
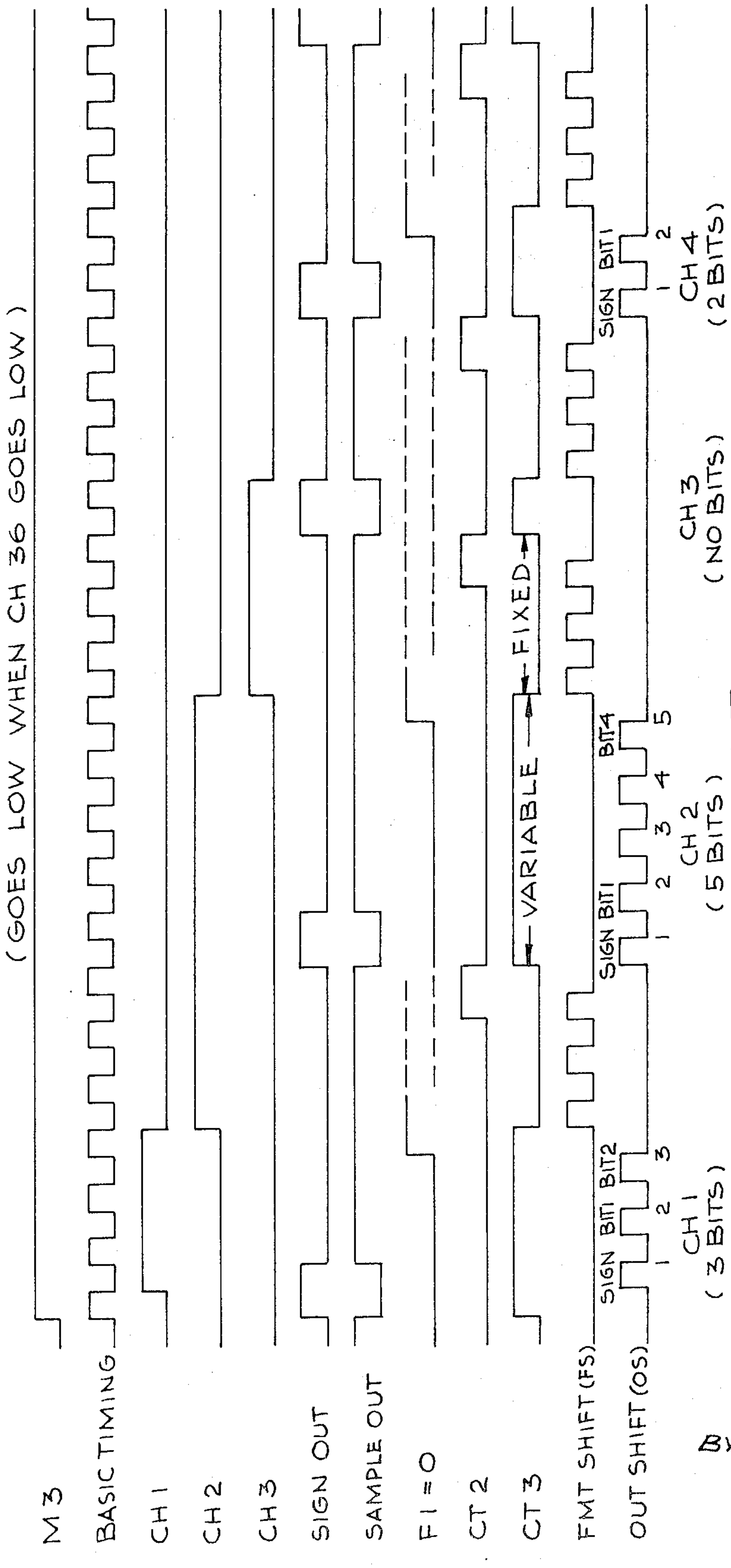
FIG. 6*d* is a timing diagram illustrating the timing signals occurring in the equipment of FIG. 6*a* during the output mode.

The F1' and F2' registers of FIG. 11*a* can be identical to the F1 and F2 registers of FIG. 6*a*. Each register includes a data input terminal and a timing input terminal. The data input terminal 400 of register F1' is connected to the output of OR gate 402. Outputs of AND gates 404 and 406 are connected to the input of OR gate 402. AND gate 406 is used to circulate the contents of register F1' during the format count mode M1', the sample count mode M2', and the output mode M3'. The AND gate 404 is utilized during the input mode to load the 36 3-bit format numbers from the inactive register (380 or 382) of FIG. 10. The output of the inactive register of FIG. 10 is entered into the F1' register during counts 1–108 of the input mode M0', as controlled by timing gate 408 whose output is coupled to the input of OR gate 410. The output of OR gate 410 is connected to the timing input terminal 412 of the F1' register and also to the transfer gate 414 coupling the output of F1' register stage 105 to the last three stages of the F1' register.

The last three stages of the F1' register function as a decrementing counter when pulses are applied to the decrementing input terminal 416 thereof. The output of the last three stages of the F1' register are applied to decoder 418, which provides an indication of the conditions specified at the output thereof in FIG. 11*a*. The output of the last three stages of the F1' register are also coupled to the input of an eight stage parallel adder 420. A second input to the adder 420 is derived from the output of a sum register 422. The sum register can be reset to −83 in response to a pulse applied to its input terminal 424. The output of adder 420 is entered into the sum register 422 via line 426. Decoder 428 is responsive to the contents of the register 422 and indicates whether the sum therein is greater than 0 or equal to or less than 0.

The register F2' is a circulating register which circulates its contents in synchronism with register F1'. The last three stages thereof function as a bidirectional counter. That is, the last three stages of the F2' register count up in response to pulses applied to input terminal 430 and count down in response to pulses applied to terminal 432. Decoder 434 indicates when the contents of the last three stages are equal to 0.

The working storage module 304 of FIG. 11*a* also includes the 83 stage sample register 384 which receives the output from the inactive register (380 or 382 of FIG. 10) during counts 109–191 of each 193 bit frame. The sample register of FIG. 11*a* is loaded during the input mode M0′ and the contents thereof are shifted out during the output mode M3′ to be discussed in conjunction with FIG. 12*a*.

In the operation of the storage module 304 of FIG. 11*a*, during the input mode M0′, 191 frame bits are shifted out of the inactive register (380 or 382) in the buffer synchronizer into the F1′ register and sample register 384 of FIG. 11*a*. Bits 1 through 108, constituting the 36 3-bit format numbers are shifted into the F1′ register and bits 109–191 constituting sample bits are shifted into the 83 bit sample register 384.

For an understanding of the operation of the working storage module of FIG. 11*a* during the format count mode M1′, attention is called to FIG. 11*b*. One hundred forty four basic timing pulses are required during this mode. Thirty-six of these basic timing pulses define add pulses while one hundred eight define shift pulses. In response to the shift pulses, the F1′ register is circulated to successively bring new 3-bit format numbers into the last three stages thereof. After each new format number is brought into the last three stages of the F1′ register, it is added to the count in the sum register in response to the occurrence of an add pulse. The sum register count is preset to −83 and it counts up toward 0 as each format number is added. If no bits were removed from a particular frame at the system encoder end, the sum register count will still be negative after all 36 format numbers have been added. If bits were removed (during compression) at the system encoder end, the sum register will contain the number of bits removed when the format count mode terminates.

In order to understand the operation of the working storage module 304 of FIG. 11*a* during the sample count mode M2′, attention is called to FIG. 11*c*. During this mode, the working storage module computes the number of bits removed from each channel sample. The end three stages of the F2′ register function as an incrementing counter as well as a shift register during this mode. The end three stages of the F1′ register function as a decrementing counter. The F1′ and F2′ registers are simultaneously circulated. Each time the format number in the last three stages of the F1′ register for a channel is greater than 2, the corresponding 3-bit F2′ format number is incremented by one via gate 450 (FIG. 11*a*) connected to the incrementing input terminal 430 of the F2′ register. Additionally, the count in the sum register 422 and the count in the last three stages of the F1′ register are decremented by one. This process of circulating, incrementing of F2′ and decrementing of F1′ and the sum register, continues until the sum register is decremented to 0. The F2′ register then contains the number of bits removed from each sample at the system encoder end.

Figures 12A, 12B:
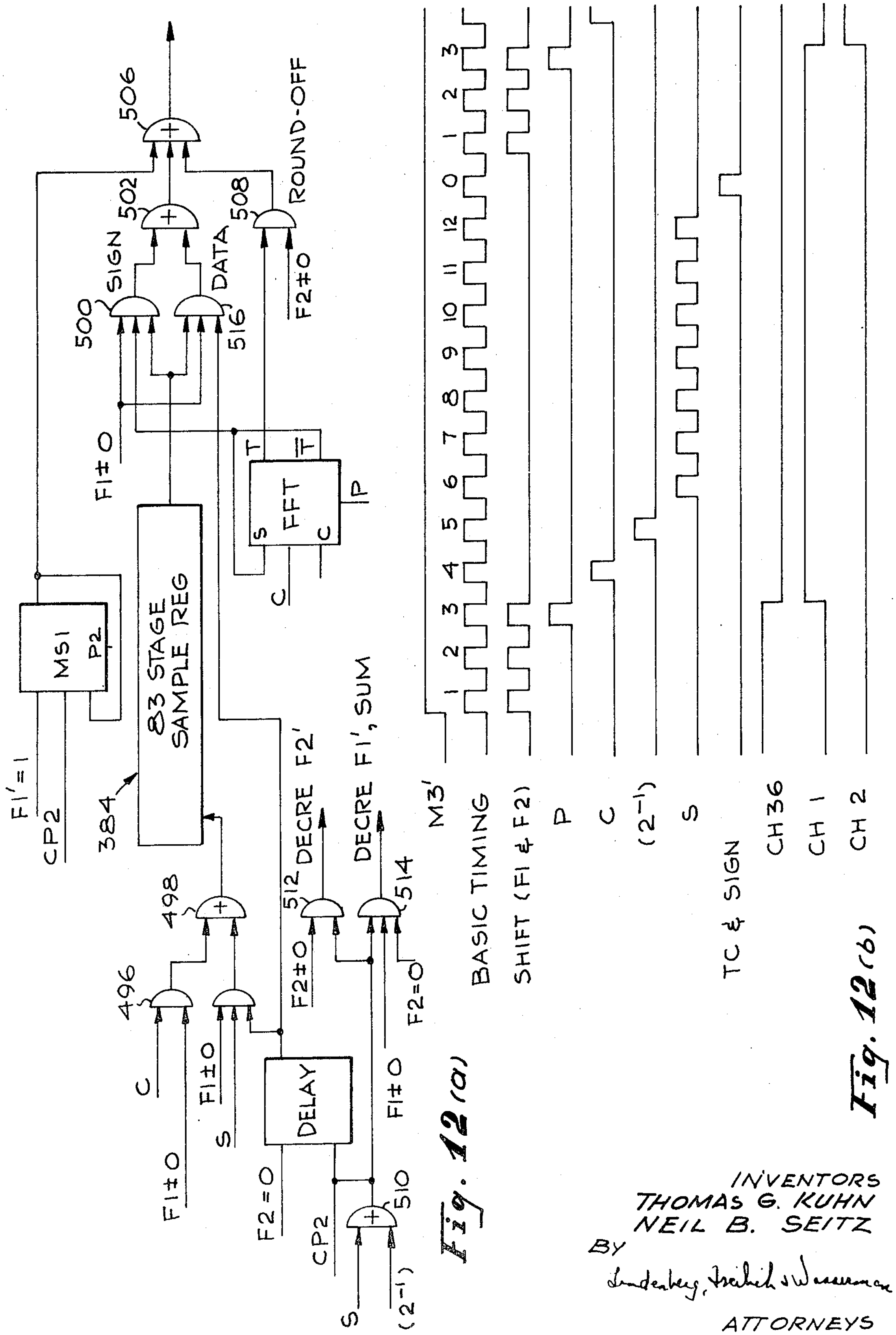
FIG. 12*a* is a block diagram of the sample regenerator of FIG. 8.
FIG. 12*b* is a timing diagram applicable to the sample regenerator of FIG. 12*a*.

During the output mode M3′, the bits developed in the F1′ and F2′ registers during the sample count mode are utilized to control the sample regenerator of FIG. 12*a*. The sample regenerator of FIG. 12*a* operates to replace the sample bits dropped at the system encoder end, and to output the sample bits from the sample register of FIG. 11*a*.

The sample regenerator of FIG. 12*a* uses the bits in the F1′ and F2′ registers developed during the sample count mode to control the regeneration process. The output mode timing is illustrated in FIG. 12*b* wherein it will be noted that 13 basic timing pulses are required to output the sample bits with respect to each channel. The initial three timing pulses of each 13 bit sequence are used to shift the F1′ and F2′ registers three stages to the right. A preset pulse P is generated coincident with basic timing pulse 3. A clock pulse C is generated coincident with basic timing pulse 4 and it is at this time that a sign bit is shifted out of the 83 bit sample register 384. Coincident with basic timing pulse 5, a further clock pulse ($2^{-1}$) is generated to shift the least significant bit equal to decimal one half out of the sample register. Coincident with timing pulses 6–12, sample bit pulses S are generated to shift the next 7 bits out of the sample register.

Each minimized and compressed sample is regenerated as follows:

a. The F1′ and F2′ format numbers for the sample are shifted into the end three stages of the F1′ and F2′ registers coincident with the shift pulses shown in FIG. 12*b*. The end three stages of the F1′ and F2′ registers function as decrementing counters as well as shift registers during the regeneration process.

b. The sign of the sample is then shifted out of the sample register to the adder subtractor module 308 unless the sample was 0 (i.e., F1′=0). This action occurs as a consequence of AND gate 496 providing a true output coincident with the generation of clock pulse C. The output of gate 496 is applied through OR gate 498 to the timing input terminal of the sample register. The single bit output from the sample register is passed by the sign gate 500 which is enabled for one bit period by the output of a flip-flop FF*t*. Flip-flop FF*t* is preset false by preset pulse P coincident with basic timing pulse 3. Clock pulse C coincident with basic timing pulses 4 switches flip-flop FF*t* true since the false output terminal thereof is connected to the set input terminal thereof. The false output terminal of flip-flop FF*t* is however connected to the input of sign gate 500 so that the single bit output from the sample register coincident with clock pulse C is gated through sign gate 500 and subsequent OR gates 502 and 504 to the sample regenerator output terminal 506 coupled to the X input terminal of the Adder/Subtractor module 308.

c. 1's are thereafter presented to the sample regenerator output terminal 506 via round-off gate 508 until the F2′ format number is decremented to 0. Decrementing of the F2′ format number occurs during basic timing pulses 5–12 as a consequence of the OR gate 510 coupled to the input of AND gate 512. The output of AND gate 512 is connected to the decrementing input terminal of the last three stages of register F2′.

d. A 0 is presented on sample regenerator output terminal 506 to the input of the Adder/Subtractor module 308 during the bit time after F2′ goes to 0 since none of the inputs to OR gate 504 can possibly be enabled. However, gate 514 is enabled at this time to decrement the last three stages of register F1′ and the count in the sum register 422 of FIG. 11*a*.

e. The transmitted sample bits for the channel are then outputted from the 83 stage sample register 384. As each bit is shifted out of the sample register, via AND gate 516, the format number in the last three stages of the F1′ register is decremented. When this format number goes to 0, all of the transmitted sample bits for that particular channel have been outputted from the sample register.

f. A 1 is presented to the Adder/Subtractor module 308 during the bit time after F1′ goes to 0. This is the "-most significant" 1 that was removed from the sample by the encoder end of the system. This 1 bit is presented by the output of flip-flop MS1 which is set true for 1 bit period when the format number in the last three bits of the F1′ register equals 1. Note that the flip-flop MS1 will be immediately reset false during the first bit time slot after the format number F1′ equals 1.

g. After the most significant 1 has been provided by the flip-flop MS1 to the sample regenerator output terminal 506, then 0's are presented for the remaining sample bits corresponding to the 0's in the original sample to the left of the most significant 1. This action occurs since none of the inputs to the gate 504 can be enabled.

As a consequence of the operation of the sample regenerator during the output mode, a rounded off 9-bit sample is serially transferred to the serial adder/subtractor module 308. The details of this module have not been illustrated since it constitutes a substantially conventional arithmetic circuit. The sample bit timing pulses S used to regenerate the original sample are also used to gate out the appropriate channel location from the sample matrix 312 to the adder/subtractor module 308. As previously pointed out, each location in the sample matrix 312 stores an absolute sign magnitude number which is either increased or decreased each differential frame by the amount of the transmitted differential. The F1′ clock pulses shift the stored sample bits into the adder/subtractor module 308 in synchronism with the $2^0$ through $2^6$ bits of the regenerated sample. A "1" $2^{-1}$ bit is outputted to the D/A converter whenever the format number in the last three stages of register F2′ indicates that a round off occurred for a particular channel, This compensates for the bias in the rounded numbers stored in the sample matrix. Whenever no round off occurred for a particular channel, $2^{-1}$ bit of "0" is outputted to the D/A converter since round off gate 508 is disabled.

From the foregoing, it will be recognized that an adaptive pulse code modulation system has been disclosed herein in which space in a fixed bit length frame is variably allocated to multiple channels on a frame by frame basis. That is, in lieu of allocating a dedicated number of bits to each channel in accordance with the usual PCM system, it should be recognized that in accordance with the invention each channel is only assigned the number of frame bits required to transmit a representation of that channel's digital sample. At the system encoder end, each channel's digital sample is minimized and/or compressed by first developing a format number for that sample identifying the position of the most significant "1" in the sample. The format number together with the sample bits less significant than the most significant "1" (perhaps in compressed form) are then transmitted over a communication link to the system decoder end. At the system decoder end, the digital samples are regenerated by essentially executing a reversal of the same minimization or compression operation executed at the system encoder end.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A system for communicating information from a plurality (n) of channels at a transmitting station, whereat said information from each channel is represented by a digital sample comprised of *k* bits, to a receiving station, said system comprising:

means at said transmitting station for forming *n* multibit format numbers, each format number uniquely identifying the bit position of the most significant "1" in one of said *n* digital samples; and means forming a multibit output word comprised of said *n* format numbers and the bits in said *n* digital samples less significant than the most significant "1" therein.

2. A system for communicating information from a plurality (n) of channels at a transmitting station, whereat said information from each channel is represented by a digital sample comprised of *k* bits, to a receiving station, said system comprising:

means at said transmitting station for forming *n* multibit format numbers, each format number uniquely identifying the bit position of the most significant "1" in one of said *n* digital samples;

means for determining the total number of bits in said *n* digital samples less significant than the most significant "1"s therein;

means for comparing said total number of less significant bits with a predetermined bit length less than *nk* bits;

means responsive to said comparing means indicating that said total number of less significant bits is greater than said predetermined bit length for processing said total number of less significant bits to reduce the number thereof to said predetermined bit length; and means forming a multibit output word comprised of said *n* format numbers and said reduced number of less significant bits.

3. The system of claim 2 including *n* *k*-bit sample registers; and means for storing each of said *k*-bit digital samples in a different one of said sample registers.

4. The system of claim 3 wherein said means for forming said format numbers includes a counter;

means for resetting said counter to a count of *K;* and logic means for sequentially coupling said sample registers to said counter, said logic means including means for serially examining the bits of each of said stored samples in order from least to most significant and for resetting said counter in response to a "1" bit and for decrementing said counter in response to a "0" bit.

5. The system of claim 3 wherein said means for processing includes means for dropping the least significant bit from said *n* sample registers in sequence.

6. The system of claim 3 including a format number register; and wherein
said means for forming format numbers includes means for sequentially loading said format numbers into said format number register during $n$ successive format intervals; and wherein
said comparing means includes a sum register; and
means for adding each of said format numbers loaded into said format number register to the content of said sum register.

7. The system of claim 6 wherein said comparing means includes means for presetting said sum register to a predetermined negative count; and
decoder means for examining the sign of the sum register content $n$ format intervals subsequent to the presetting of said sum register.

8. The system of claim 6 wherein said means forming an output word includes an output register; and
means for loading said format numbers into said output register in concert with said loading into said format number register.

9. The system of claim 6 wherein said means for processing includes means for sequentially decrementing said formant numbers stored in said format number register and for sequentially dropping the least significant bit of the corresponding samples stored in said sample register.

10. The system of claim 9 including means for decrementing said sum register each time one of said format numbers is decremented.

11. The system of claim 10 wherein said means forming an output word includes an output register;
means for loading said format numbers into said output register in concert with said loading into said format number register; and
means active subsequent to said means for processing for transferring from each of said sample registers to said output register, a number of bits equal to the value of the corresponding number in said format number register.

12. In a communication system, a subsystem for representing $n$ $k$-bit digital samples in a multibit frame comprised of less than $nk$ bit positions, said means including:
means for determining the position of the most significant "1" in each of said digital samples and for forming $n$ $i$-bit format numbers, each identifying the position of said most significant "1" in one of said $n$ samples;
an output register;
means for storing said $n$ format numbers in said output register; and
means for extracting bits from each of said digital samples less significant than the bit position identified by the format number associated with that sample; and
means for storing said extracted bits in said output register.

13. The subsystem of claim 12 including means for determining whether the sum of said ni format number bits plus said bits from said digital samples less significant than the bit positions identified by said format numbers exceeds $nk$.

14. The subsystem of claim 13 wherein said means for extracting bits includes means responsive to said sum exceeding $nk$ for corresponding said bits from said digital samples less significant than the bit positions identified by said format numbers to reduce said sum to $nk$.

15. The subsystem of claim 14 wherein said means for compressing includes means for dropping the least significant bit from each of said samples in sequence until the sum of said $ni$ format number bits plus the remaining bits from said digital samples less significant than the bit positions identified by said format numbers is equal to $nk$.

16. The subsystem of claim 15 including regeneration means responsive to the bits stored in said output register for regenerating said $k$ bit digital samples.

* * * * *